(12) United States Patent
Kurz

(10) Patent No.: US 8,030,376 B2
(45) Date of Patent: Oct. 4, 2011

(54) PROCESSES FOR DISPERSING SUBSTANCES AND PREPARING COMPOSITE MATERIALS

(75) Inventor: David W. Kurz, Woolwich, NJ (US)

(73) Assignee: MinusNine Technologies, Inc., Philadelphia, PA (US)

( * ) Notice: Subject to any disclaimer, the term of this patent is extended or adjusted under 35 U.S.C. 154(b) by 1002 days.

(21) Appl. No.: 11/776,860

(22) Filed: Jul. 12, 2007

(65) Prior Publication Data

US 2010/0152326 A1 Jun. 17, 2010

Related U.S. Application Data

(60) Provisional application No. 60/830,385, filed on Jul. 12, 2006.

(51) Int. Cl.
*C09B 67/00* (2006.01)

(52) U.S. Cl. ............... 523/333; 523/334; 523/339

(58) Field of Classification Search .......... 523/333, 523/334, 339
See application file for complete search history.

(56) References Cited

U.S. PATENT DOCUMENTS

| | | | |
|---|---|---|---|
| 2,420,761 A | 5/1947 | Thomas | 196/147 |
| 4,404,173 A | 9/1983 | Bailey et al. | 422/257 |
| 4,487,674 A | 12/1984 | Jan Al et al. | 204/181 R |
| 4,518,728 A | 5/1985 | Pollard | 524/88 |
| 4,524,199 A | 6/1985 | Lok et al. | 527/313 |
| 4,543,390 A | 9/1985 | Tanaka et al. | 525/63 |
| 4,545,901 A | 10/1985 | Schneider | 210/634 |
| 4,651,092 A | 3/1987 | Brunsch et al. | 324/204 |
| 4,665,107 A | 5/1987 | Micale | 523/105 |
| 4,694,035 A | 9/1987 | Kasai et al. | 524/458 |
| 4,788,246 A | 11/1988 | Tsuchiya et al. | 524/554 |
| 4,879,337 A | 11/1989 | Shibato et al. | 524/504 |
| 4,952,293 A | 8/1990 | Sypula et al. | 20/180 |
| 4,952,651 A | 8/1990 | Kasai et al. | 526/201 |
| 4,968,399 A | 11/1990 | Tsuchiya et al. | 204/181.1 |
| 4,972,000 A | 11/1990 | Kawashima et al. | 521/54 |
| 4,985,064 A | 1/1991 | Redlich et al. | 71/90 |
| 4,990,411 A | 2/1991 | Nakayama et al. | 428/614 |
| 5,030,685 A | 7/1991 | Doi et al. | 524/593 |
| 5,063,125 A | 11/1991 | Yuh et al. | 430/59 |
| 5,066,422 A | 11/1991 | Felter et al. | 252/511 |
| 5,070,120 A | 12/1991 | Sakamoto et al. | 523/412 |
| 5,077,347 A | 12/1991 | Yabuta et al. | 524/504 |
| 5,082,595 A | 1/1992 | Glckin | 252/511 |
| 5,093,390 A | 3/1992 | Shibato et al. | 523/339 |
| 5,157,067 A | 10/1992 | Burditt et al. | 524/270 |
| 5,173,533 A | 12/1992 | Yabuta et al. | 524/523 |
| 5,183,214 A | 2/1993 | Zakheim et al. | 241/30 |
| 5,200,461 A | 4/1993 | Tsuchiya et al. | 524/510 |
| 5,213,895 A | 5/1993 | Hirai et al. | 428/403 |
| 5,225,279 A | 7/1993 | Redlich et al. | 428/402.22 |
| 5,254,263 A | 10/1993 | Gerace et al. | 210/667 |
| 5,266,229 A | 11/1993 | Tomizawa et al. | 252/73 |
| 5,279,931 A | 1/1994 | Bagchi et al. | 430/449 |
| 5,290,898 A | 3/1994 | Doi et al. | 528/76 |
| 5,296,266 A | 3/1994 | Kunugi et al. | 427/213.36 |
| 5,308,395 A | 5/1994 | Burditt et al. | 106/500 |
| 5,320,944 A | 6/1994 | Okada et al. | 435/7.94 |
| 5,344,874 A | 9/1994 | Doi et al. | 524/593 |
| 5,362,417 A | 11/1994 | Ziolo | 252/314 |
| 5,364,754 A | 11/1994 | Kim et al. | 430/569 |
| 5,376,308 A | 12/1994 | Hirai et al. | 252/518 |
| 5,385,812 A | 1/1995 | Bagchi et al. | 430/449 |
| 5,438,107 A | 8/1995 | Doi et al. | 525/456 |
| 5,563,206 A | 10/1996 | Eicken et al. | 524/590 |
| 5,616,645 A | 4/1997 | Kuwamura et al. | 524/546 |
| 5,620,826 A | 4/1997 | Tavernier et al. | 430/137 |
| 5,621,021 A | 4/1997 | Yoshioka et al. | 523/160 |
| 5,639,441 A | 6/1997 | Sievers et al. | 424/9.3 |
| 5,648,416 A | 7/1997 | Miller et al. | 524/500 |
| 5,662,279 A | 9/1997 | Czkai et al. | 241/21 |
| 5,705,559 A | 1/1998 | Sakamoto et al. | 524/531 |
| 5,709,983 A | 1/1998 | Brick et al. | 430/519 |
| 5,719,205 A | 2/1998 | Yoshihara | 523/209 |
| 5,723,255 A | 3/1998 | Texter et al. | 430/203 |
| 5,723,506 A | 3/1998 | Glorioso et al. | 521/79 |
| 5,770,216 A | 6/1998 | Mitchnick et al. | 428/402 |
| 5,773,492 A | 6/1998 | Ferguson | 523/171 |
| 5,851,961 A | 12/1998 | Magyar | 507/119 |
| 5,853,621 A | 12/1998 | Miller et al. | 252/500 |
| 5,902,711 A | 5/1999 | Smith et al. | 430/137 |
| 5,929,161 A | 7/1999 | Schafheutle et al. | 524/591 |
| 5,945,095 A | 8/1999 | Mougin et al. | 424/78.02 |
| 5,948,469 A | 9/1999 | Morita et al. | 427/197 |
| 5,962,082 A | 10/1999 | Hendrickson et al. | 427/547 |
| 5,968,694 A | 10/1999 | Sakai et al. | 430/56 |

(Continued)

FOREIGN PATENT DOCUMENTS

WO    WO 97/49762 A1    12/1997

OTHER PUBLICATIONS

Bumsuk, K., et al., "Electrical properties of single-wall carbon nanotube and epoxy composites," J. of Applied Physics, 2003, 94(10), 6724-2728.

(Continued)

*Primary Examiner* — Edward Cain

(74) *Attorney, Agent, or Firm* — Woodcock Washburn, LLP

(57) ABSTRACT

Disclosed herein are processes for dispersing a plurality of unaggregated particles, such as nanoparticles and microparticles, in a viscous medium. The dispersions can be used for making a variety of useful materials, such as carbon nanotube composites.

22 Claims, 13 Drawing Sheets

U.S. PATENT DOCUMENTS

| | | | |
|---|---|---|---|
| 5,969,091 A | 10/1999 | Akita et al. | 528/423 |
| 6,017,666 A | 1/2000 | Nealey et al. | 430/59.4 |
| 6,025,441 A | 2/2000 | Koshirai et al. | 525/199 |
| 6,030,699 A | 2/2000 | Wang et al. | 428/327 |
| 6,034,154 A | 3/2000 | Kase et al. | 523/161 |
| 6,051,614 A | 4/2000 | Hirai et al. | 516/20 |
| 6,075,090 A | 6/2000 | Wang et al. | 524/763 |
| 6,095,134 A | 8/2000 | Sievers et al. | 128/200.14 |
| 6,108,062 A | 8/2000 | Takeuchi et al. | 349/88 |
| 6,162,857 A | 12/2000 | Trexler, Jr. et al. | 524/445 |
| 6,177,486 B1 | 1/2001 | Ferguson | 523/161 |
| 6,190,777 B1 | 2/2001 | Asano et al. | 428/447 |
| 6,200,680 B1 | 3/2001 | Takeda et al. | 428/402 |
| 6,239,079 B1 | 5/2001 | Topchiashvili et al. | 505/124 |
| 6,264,917 B1 | 7/2001 | Klaveness et al. | 424/9.52 |
| 6,306,931 B1 | 10/2001 | Ferguson | 523/161 |
| 6,309,787 B1 | 10/2001 | Cheng | 430/137.14 |
| 6,359,052 B1 | 3/2002 | Trexler, Jr. et al. | 524/445 |
| 6,386,796 B1 | 5/2002 | Hull | 405/128.25 |
| 6,391,537 B2 | 5/2002 | Lelental et al. | 430/620 |
| 6,395,848 B1 | 5/2002 | Morgan et al. | 526/214 |
| 6,402,315 B1 | 6/2002 | Kato | 347/100 |
| 6,403,162 B1 | 6/2002 | Tokunaga et al. | 427/379 |
| 6,407,160 B2 | 6/2002 | Wang et al. | 524/763 |
| 6,426,590 B1 | 7/2002 | Chung et al. | 313/496 |
| 6,433,481 B1 | 8/2002 | Marutsuka | 313/634 |
| 6,441,083 B1 | 8/2002 | Kuwamoto et al. | 524/492 |
| 6,484,454 B1 | 11/2002 | Everhart | 52/79.4 |
| 6,489,404 B2 | 12/2002 | Bolluijt et al. | 525/397 |
| 6,514,644 B2 | 2/2003 | Yamagata et al. | 430/7 |
| 6,528,572 B1 | 3/2003 | Patel et al. | 524/495 |
| 6,531,254 B1 | 3/2003 | Bedells et al. | 430/109.3 |
| 6,531,256 B1 | 3/2003 | Bedells et al. | 430/137.14 |
| 6,533,860 B1 | 3/2003 | Hatakeyama et al. | 106/494 |
| 6,541,114 B2 | 4/2003 | Katou et al. | 428/403 |
| 6,599,446 B1 | 7/2003 | Todt et al. | 252/511 |
| 6,599,631 B2 | 7/2003 | Kambe et al. | 428/447 |
| 6,602,741 B1 | 8/2003 | Kudoh et al. | 438/141 |
| 6,604,408 B2 | 8/2003 | Dosramos et al. | 73/61.75 |
| 6,604,698 B2 | 8/2003 | Verhoff et al. | 241/21 |
| 6,617,377 B2 | 9/2003 | Chacko | 524/99 |
| 6,620,887 B2 | 9/2003 | Fujimoto et al. | 525/193 |
| 6,623,978 B2 | 9/2003 | Takao et al. | 436/164 |
| 6,624,212 B2 | 9/2003 | Weier et al. | 523/201 |
| 6,627,689 B2 | 9/2003 | Lino et al. | 524/404 |
| 6,632,497 B2 | 10/2003 | Shimizu et al. | 428/36.9 |
| 6,673,953 B2 | 1/2004 | Keller et al. | 556/143 |
| 6,689,835 B2 | 2/2004 | Amarasekera et al. | 524/495 |
| 6,699,316 B2 | 3/2004 | Marx et al. | 106/425 |
| 6,721,055 B2 | 4/2004 | Hatfield et al. | 356/445 |
| 6,723,774 B2 | 4/2004 | Guntherberg et al. | 524/458 |
| 6,727,305 B1 | 4/2004 | Pavez Aranguiz | 524/423 |
| 6,734,262 B2 | 5/2004 | Patel | 525/419 |
| 6,747,739 B2 | 6/2004 | Takao et al. | 356/364 |
| 6,753,370 B2 | 6/2004 | Nakatsukasa et al. | 524/400 |
| 6,762,237 B2 | 7/2004 | Glatkowski et al. | 524/496 |
| 6,777,463 B2 | 8/2004 | Ando et al. | 523/160 |
| 6,784,231 B2 | 8/2004 | Shimada et al. | 524/93 |
| 6,788,362 B2 | 9/2004 | Stephenson et al. | 349/86 |
| 6,790,426 B1 | 9/2004 | Ohsaki | 423/447.2 |
| 6,797,342 B1 | 9/2004 | Sanchez et al. | 427/600 |
| 6,806,996 B2 | 10/2004 | Tatsuura et al. | 359/298 |
| 6,811,917 B2 | 11/2004 | Fitts et al. | 429/38 |
| 6,815,466 B2 | 11/2004 | Van Rheenen | 521/29 |
| 6,822,035 B2 | 11/2004 | Chaiko | 524/445 |
| 6,827,639 B2 | 12/2004 | Nishida et al. | 451/330 |
| 6,828,015 B2 | 12/2004 | Hirata et al. | 428/323 |
| 6,833,165 B2 | 12/2004 | Tokita et al. | 156/334 |
| 6,838,507 B2 | 1/2005 | Chou et al. | 524/445 |
| 6,853,540 B2 | 2/2005 | Kudoh et al. | 361/523 |
| 6,861,466 B2 | 3/2005 | Dadalas et al. | 524/544 |
| 6,861,481 B2 | 3/2005 | Ding et al. | 525/424 |
| 6,863,718 B2 | 3/2005 | Lamborn et al. | 106/14.12 |
| 6,867,251 B2 | 3/2005 | Wang et al. | 524/190 |
| 6,872,773 B2 | 3/2005 | Pakusch et al. | 524/560 |
| 6,881,448 B1 | 4/2005 | Hattori | 427/307 |
| 6,881,490 B2 | 4/2005 | Kambe et al. | 428/447 |
| 6,884,844 B2 | 4/2005 | Hamilton et al. | 525/71 |
| 6,884,861 B2 | 4/2005 | Keller et al. | 526/285 |
| 6,890,504 B2 | 5/2005 | Keller et al. | 423/440 |
| 6,890,983 B2 | 5/2005 | Rosano et al. | 524/401 |
| 6,890,991 B2 | 5/2005 | Fujimoto et al. | 525/199 |
| 6,893,649 B2 | 5/2005 | Sasaki et al. | 424/401 |
| 6,896,864 B2 | 5/2005 | Clarke | 423/447 |
| 6,896,958 B1 | 5/2005 | Cayton et al. | 428/323 |
| 6,900,254 B2 | 5/2005 | Wills et al. | 523/221 |
| 6,902,781 B2 | 6/2005 | Endo et al. | 428/32.35 |
| 6,905,667 B1 | 6/2005 | Chen et al. | 423/447 |
| 6,908,573 B2 | 6/2005 | Hossan | 252/511 |
| 6,919,063 B2 | 7/2005 | Jang et al. | 423/445 B |
| 6,919,395 B2 | 7/2005 | Rajagopalan et al. | 524/432 |
| 6,921,433 B2 | 7/2005 | Kuribayashi et al. | 106/499 |
| 6,924,333 B2 | 8/2005 | Bloom et al. | 524/315 |
| 6,934,144 B2 | 8/2005 | Ooma et al. | 361/303 |
| 6,936,322 B2 | 8/2005 | Sakakibara et al. | 428/64.1 |
| 6,936,653 B2 | 8/2005 | McElrath et al. | 524/496 |
| 6,939,922 B2 | 9/2005 | Beckley et al. | 525/329.7 |
| 6,946,214 B2 | 9/2005 | Xie et al. | 429/42 |
| 6,947,203 B2 | 9/2005 | Kanbe | 359/296 |
| 6,949,138 B2 | 9/2005 | Nakamura et al. | 106/401 |
| 6,949,622 B2 | 9/2005 | Silvi et al. | 528/481 |
| 6,951,666 B2 | 10/2005 | Kodas et al. | 427/376.6 |
| 6,956,082 B1 | 10/2005 | Johnson et al. | 524/547 |
| 6,960,385 B2 | 11/2005 | Huelsman et al. | 428/323 |
| 6,969,504 B2 | 11/2005 | Smalley et al. | 423/447.2 |
| 6,972,129 B1 | 12/2005 | Ogawa et al. | 424/401 |
| 6,986,853 B2 | 1/2006 | Glatkowski et al. | 264/36.19 |
| 6,989,410 B2 | 1/2006 | Hamilton et al. | 523/340 |
| 6,991,809 B2 | 1/2006 | Anderson | 424/490 |
| 6,998,051 B2 | 2/2006 | Chattopadhyay et al. | 210/634 |
| 2002/0168402 A1 | 11/2002 | Kipp et al. | 424/450 |
| 2004/0022862 A1 | 2/2004 | Kipp et al. | 424/490 |
| 2004/0071781 A1 | 4/2004 | Chattopadhyay et al. | 424/489 |
| 2004/0219221 A1 | 11/2004 | Moore et al. | 424/489 |
| 2005/0100501 A1 | 5/2005 | Veedu et al. | 423/447.2 |
| 2005/0113489 A1* | 5/2005 | Baran et al. | 523/300 |
| 2005/0265120 A1 | 12/2005 | Naoe | 366/114 |

OTHER PUBLICATIONS

Hafner, J.H., et al., "Catalytic growth of single-wall carbon nanotubes from metal particles," Chem. Phys. Lett, 1998, 296, 195-202.

Islam, M.F., et al., "High weight fraction surfactant solubilization of single-wall carbon nanotubes in water," Nano Letters, 2003, 3(2), 269-273.

Park, C., et al., "Dispersion of single wall carbon nanotubes by in situ polymerization under sonication," Chem. Physics Letts, 2002, 364, 303-308.

Ramasubramaniam, R., et al., "Homogeneous carbon nanotube/polymer composites for electrical applications," Appl. Physics Letts, 2003, 83(14), 2928-2930.

Rinzler, A.G., et al., "Large-scale purification of single-wall carbon nanotubes: process, product, and characterization," Appl. Phys. A, 1998, 67, 29-37.

Sandler, J., "Development of a dispersion process for carbon nanotubes in an epoxy matrix and the resulting electrical properties," Polymer 40, 1999, 5967-5971.

Sandler, J.K.W., et al., "Ultra-low electrical percolation threshold in carbon-nanotube-epoxy," Polymer, 2003, 44, 5893-5899.

Search Report created on Jun. 19, 2006, MicroPatent, 41 citations listed, i-iii; 1-53.

* cited by examiner

1600

1700

PROCESSES FOR DISPERSING SUBSTANCES AND PREPARING COMPOSITE MATERIALS

CROSS REFERENCE TO RELATED APPLICATIONS

This patent application claims the benefit of U.S. Provisional Patent Application No. 60/830,385, filed Jul. 12, 2006, the entirety of which is incorporated by reference herein.

FIELD OF THE INVENTION

The disclosed invention is in the field of processes for preparing dispersions of substances in liquid mediums. The disclosed invention is also in the field of preparing composite materials, particularly nanocomposite materials. The disclosed invention is also in the field of processing materials comprising carbon nanotubes.

BACKGROUND TO THE INVENTION

Dispersing fine grained powder having an average primary particle size of micron to nanometer scales or smaller into a solvent, resin, or polymer has become increasingly important in producing a variety of useful materials, such as functional films, adhesives, coatings, bulk materials, and the like. In particular, dispersing fine-grained powder is important in terms of forming uniformly distributed composite materials without defects, aggregation, or liquid handling difficulties (liquid viscosity reduction). Increasingly important are processes which create concentrated particle dispersions, often called "concentrates" or "particle pastes".

A number of methods of dispersing fine grained powder into a quasi-stable solutions are known. For example, roller mills and other rotating types of mixers disperse particles by a crushing agglomerated particles by applying a low speed, high tangential shear force to the particles. The roller mill method uses compressive forces to crush fine grained powder to smaller particle sizes, while at the same time absorbing resin components such as a compatibilizing agents are compressed into the surface of the particle by a high shearing mixing force, but non-uniform mixed portions are also compressed by this strong force causing the formation of larger (agglomerated) particles. Particles smaller than the average interstitial space can have little compressive force applied to them by the process. This not only prevents crushing of these smaller particles but also increases throughput time consequently reducing productivity. Roller mills also often are acoustically polluting, cause low frequency vibrations, and are labor intensive.

Homogenizing high speed/high torque mixers are known to crush particles by high speed rotation in the relatively narrow rotor/stator gap. Such processes undesirably form sediment when fine grained powder having an average primary particle size in nanometer to micron scales are dispersed into a low viscosity solvent or resin. Some believe that the attractive particle energy is low and the mixing vortex provides insufficient collision frequency of agglomerated particles, thereby preventing the facile formation of a dispersion liquid with reduced particle size from the starting fluid, and a less homogeneous dispersion overall.

Jet mill dispersion methods are known to cause collisions of liquids at high pressure, which requires large, dangerous, and expensive equipment. The drawbacks of these methods are similar to the homogenizing high speed mixing systems. This dispersion system also has drawbacks in terms of cleaning and maintenance do to complicated internal mechanisms. Jet mills also often are large, expensive, and changing compositions or cleaning are very labor intensive.

Small diameter bead or sand mill dispersion methods are known for uniformly dispersing a solution containing fine grained powder via the coordinated use of bead diameter, filling factor of beads into a device, residence time of the dispersed liquid in the device, particle/volume ratio of the dispersion, and an absorption state of a dispersion agent or other additive to the particle surface. However, particle crushing occurs during the process, which can give rise to agglomeration of particles and increase liquid viscosity, which reduces productivity. Dispersions made by the bead mill dispersion method are also limited by the relatively large size of commercially available beads and the interstitial space between the crushing beads (determined by bead diameter. Thus, it is difficult to disperse powder having an average primary particle size in micron to nanometer scales or less into a solvent or a solution, and to construct a dispersion system that provides high volume production. The beads themselves are often very difficult to clean since the particle used can be highly compressed into the surface structures of the bead themselves. Cleaning often requires extensive flushing with water or solvent, which is expensive, potentially polluting, and highly labor intensive.

Ultrasonic batch type dispersers are known for preparing a small amount of liquid such as for pretreatment of measurement of an experiment level or a particle size distribution. Ultrasonic batch type dispersers generally have liquid circulation problems, and as a result, ultrasound is not uniformly applied to liquid dispersions. Ultrasonic dispersers may also damage delicate materials.

Various problems, such as those described above, become more pronounced as the particle size of the fine grained powder becomes smaller. Moreover, dissolved particles generally cannot be dispersed by any of the previously mentioned methods. The aforementioned techniques also suffer from particle agglomeration problems. Because the surface area/volume ratio of fine grained powders increases with decreasing particle size, there is an increased tendency for particles to agglomerate, which is generally undesirable. Reducing the size of these so-called "secondary agglomerated particles" is difficult for commercial powder producers. Accordingly, there is a continuing need to disperse sub-micron scale (ca. 0.1 to 1 microns) and nanometer-scale (ca. 0.1 to about 100 nanometers) particles in dispersing media.

SUMMARY OF THE INVENTION

In various aspects, the present invention describes processes useful to manufacture composite materials and fluids, including soluble particles and liquids, and more particularly to processes that disperse as a starting material dry powders having an average primary particle size of sub-micron to nanometer scales or smaller into an medium, such as solvent, resin, polymer, oligomer, or any combination thereof. The processes described herein are able, inter alia, to prepare liquids with high dispersion stability containing little or no sediment, as well as little or no additional additives. Indeed, the processes described herein allow for facile mass production. Various aspects of the invention provide processes that purifies as well as disperses particles in dispersing media. Other aspects provide processes that create stable dispersions in a straightforward one-pot procedure. Some processes require little or no surfactant, compatibilizing agent, or other potentially contaminating agent. Useful end-products arising from the processes of the present invention include particle dispersions as well as particle concentrates or incompatible blends with improved mixing and smaller domains.

Accordingly, in one aspect of the present invention there are provided processes for dispersing nanoparticles in a viscous medium, comprising: providing a nanocarrier dispersion comprising a dilute concentration of individual nanoparticles dispersed in a nanocarrier solvent, wherein the nanocarrier solvent is characterized as being soluble in the viscous medium, wherein the nanocarrier dispersion has a viscosity substantially lower than the viscosity of the viscous medium; contacting the nanocarrier dispersion within the viscous medium, wherein the nanocarrier solvent diffuses out of the nanocarrier dispersion thereby depositing individual nanoparticles in the viscous medium; and continuously removing the nanocarrier solvent from the viscous medium to give rise to a plurality of nanoparticles dispersed in the viscous medium.

In another aspect of the present invention there are provided processes of dispersing particles in a polymeric fluid, comprising: providing an particle solution comprising solvent, particles, and polymer, the particle solution being characterized as comprising well dispersed individual particles and the solvent characterized as being more soluble in water than in the polymeric fluid; continuously contacting droplets of the particle solution with the polymeric fluid in a droplet contact zone to form a mixture comprising the particles, the solvent, and the polymeric fluid; transporting the droplets of the particle solution away from the droplet contact zone, the transported droplets being richer in solvent exterior to the droplet zone, the particles and polymer entering the polymeric fluid; and contacting the polymeric fluid with an aqueous phase at an interface zone located exterior to the dispersion zone while simultaneously extracting at least a portion of the solvent out of the polymeric fluid.

Other aspects of the present invention provide methods of dispersing particles in a viscous medium, comprising: providing a particle solution comprising a plurality of particles and a solvent, the particle solution being characterized as comprising essentially well dispersed individual particles, and the solvent characterized as being more soluble in water than in the viscous medium; contacting the particle solution with the fluid medium in a dispersion zone to form a one-phase mixture comprising the particles, the solvent, and the fluid medium; and contacting the one-phase mixture with an aqueous phase at an interface zone located exterior to the dispersion zone while simultaneously extracting at least a portion of the solvent out of the one-phase mixture and into the aqueous phase.

In additional aspects of the present invention there are provided methods of dispersing particles in an fluid medium, comprising: providing an particle solution comprising a plurality of particles and a solvent, the particle solution being characterized as comprising essentially well dispersed individual particles, and the solvent characterized as being more soluble in water than in the fluid medium; contacting the particle solution with the fluid medium in a dispersion zone to form a one-phase mixture comprising the particles, the solvent, and the fluid medium, the contacting occurring while simultaneously sonicating both the particle solution and the fluid medium in the dispersion zone; and contacting the one-phase mixture with an aqueous phase at an interface zone located exterior to the dispersion zone while simultaneously extracting at least a portion of the solvent out of the one-phase mixture and into the aqueous phase.

The general description and the following detailed description are exemplary and explanatory only and are not restrictive of the invention, as defined in the appended claims. Other aspects of the present invention can be apparent to those skilled in the art in view of the detailed description of the invention as provided herein.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings.

DETAILED DESCRIPTION AND OTHER ILLUSTRATIVE EMBODIMENTS

Figure 1:
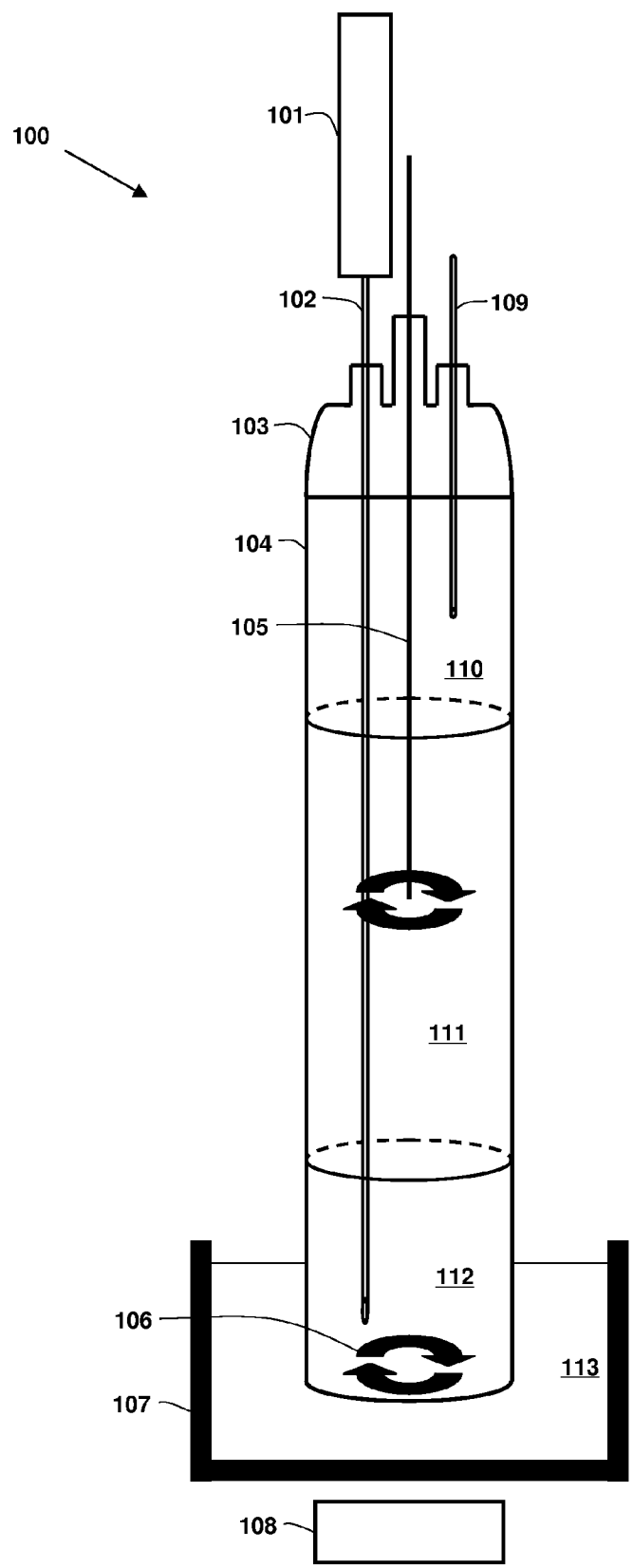
FIG. 1 illustrates a system and method useful for carrying out an embodiment of the present invention including particle dispersion and sonication in an phase and extraction by an aqueous phase in contact with the phase.

The present invention can be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it can be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

As employed above and throughout the disclosure, the following terms, unless otherwise indicated, shall be understood to have the following meanings.

"Plurality" means more than one.

"Nanoscale" refers generally to dimensions in the range of from about 0.1 nanometer ("nm") up to about 100 nm.

"Viscosity" can be a relative term or an absolute term, as used herein. Where the description refers to a particular embodiment of a process comprising a "low viscosity" fluid and a "high viscosity" fluid, the viscosities of each are relative to each, and typically vary by a factor of at least 2, or at least 5, or at least 10, or at least 20, or at least 50, or at least 100, or at least 200, or at least 500, or at least 1000, or at least 10,000, or even at least 100,000, or up to 2, or up to 5, or up to 10, or up to 20, or up to 50, or up to 100, or up to 200, or up to 500, or up to 1000, or up to 10,000, or even up to 100,000. Viscosities of the fluids used herein can be very low, such as less than about 0.01 centipoise ("cP"), or less than about 0.1 cP, or less than about 1 cP, or less than about 10 cP, or less than about 1000 cP. Such viscosities can be suitably used for the solvents, as well as the fluids used for dispersing the particles, polymers, nanoparticles, and the like in the nanocarrier dispersions, particle solutions, and the like. Viscosities of the fluids used herein, especially those used in the viscous media and viscous fluids, can be as high as about 1000 cP, or as high as about $10^4$ cP, or as high as about $10^5$ cP, or as high as about $10^6$ cP, or as high as about $10^7$ cP, or as high as about $10^8$ cP, or as high as about $10^9$ cP, or even higher in certain cases. Viscosities can also vary with temperature.

Processes for dispersing nanoparticles in a viscous medium are provided herein. These processes generally comprise the steps of providing a nanocarrier dispersion comprising a dilute concentration of individual nanoparticles dispersed in a nanocarrier solvent, wherein the nanocarrier solvent is characterized as being soluble in the viscous medium, wherein the nanocarrier dispersion has a viscosity substantially lower than the viscosity of the viscous medium; contacting the nanocarrier dispersion within the viscous medium, wherein the nanocarrier solvent diffuses out of the nanocarrier dispersion thereby depositing individual nanoparticles in the viscous medium; and continuously removing the nanocarrier solvent from the viscous medium to give rise to a plurality of nanoparticles dispersed in the viscous medium.

In some embodiments it is desirable that the nanocarrier is relatively cool (e.g., less than about 25° C.) and the dispersion is relatively hot (e.g., greater than about 50° C.). Dispersions can be stored and kept stable for long periods of time when kept cold (e.g., at less than about 0° C.).

Suitable viscous medium can include any type of oligomer-containing or polymer-containing fluid, in or such as an epoxy resin in solvent. A number of other polymers and oligomers are described further below.

The processes of the present invention may include, but do not require the use of particle dispersing aids, such as surfactants or dispersing agents, to provide particle dispersions. Use of dispersing aids typically increase the stability of the particle dispersions.

Suitable nanocarrier dispersions comprise a dilute concentration of nanoparticles, for example, less than 1%, or less than 0.1%, or less than 0.01%, or less than 0.001%, or less than 0.0001%, or even less than 0.00001%, and at least about $10^{-7}$%, or up to 10%, or up to 5%, or up to 2%, up to 1%, or up to 0.1%, or up to 0.01%, or up to 0.001%, or up to 0.0001%, or even up to 0.00001%, based on weight of total nanocarrier, of individual nanoparticles in a solvent for the nanoparticle, of substances that are soluble in the carrier solvent, or any combination thereof. Suitable nanoparticles include any of the variety of nanoparticles, such as nanotubes, described herein. Suitable nanocarriers may also include any of a variety of other additives commonly used in the plastics, polymers, and materials arts, examples of which include pigments, dyes, processing aids, rheology modifiers, opacifiers, thermal stabilizers, UV stabilizers, anti-oxidants, and the like. The nanocarrier dispersions may include one or more dispersing aids, but typically suitable nanocarriers are free, or substantially free, of dispersing aids. Nanoparticles can be dispersed in a nanocarrier solvent, wherein the nanocarrier solvent is characterized as being soluble in the viscous medium, and wherein the nanocarrier dispersion has a viscosity substantially lower than the viscosity of the viscous medium. Suitable nanocarrier solvents can be any solvent that is capable of dissolving the nanoparticles at dilute concentrations, and which is soluble in the viscous medium. Examples of suitable nanocarrier solvents include THF and DMF, and others, are described further herein. Suitable substances can range in solubility; from soluble, to partially soluble, to a very small particle dispersion, to a large particle dispersion, to an insoluble slurry of particles.

In some embodiments, a small amount of resin (e.g., polymer) is included in the nanocarrier solvent dispersion to aid in stabilizing the dispersion. Small amounts of resin can help prevent dispersed particles from flocculating, aggregating, or otherwise collapsing back together after the nanocarrier solvent diffuses into the resin. Different types of resins can also be added to encapsulate the particles. Encapsulation can also increase the stability of the particles.

The nanocarrier dispersions are suitably contacted within the viscous medium as a plurality of droplets ranging in volume from about 1 picoliter to about 1 milliliter, or about 10 picoliters to about 0.1 milliliter, or about 100 picoliters to about 0.01 milliliters, or about 1 nanoliter to about 1 microliter, or about 10 nanoliters to about 0.1 microliters, or as a stream. This contacting can be carried out while stiffing the viscous medium under conditions of low shear, or even under conditions of diffusion-dominated mass transport. During this process, substantially all of the nanocarrier solvent diffuses out of the droplets or the stream of the nanocarrier dispersion and into the viscous medium. Without being bound by any particular theory of operation, this gives rise to individual nanoparticles being deposited in the viscous medium. Concurrently or subsequently, in a continuous, semi-continuous, or batch-wise process, the nanocarrier solvent is removed from the viscous medium. Removal of the nanocarrier solvent can be suitably removed by extracting the nanocarrier-solvent with an aqueous phase. During this extraction, the nanocarrier solvent concentration in the viscous medium is kept very low (below about 0.1% v/v, or below about 0.01% v/v, or below about 0.001% v/v) to give rise to a plurality of nanoparticles dispersed in the viscous medium. The nanoparticle dispersion can be characterized as a true solution, stable, or quasi-stable. Quasi-stable nanoparticle dispersions, as described further herein, can become unstable over time (e.g., the nanoparticles flocculate or aggregate), but are kept in quasi-stable state by preventing particle migration by increasing the viscosity of the viscous medium after the nanoparticles are dispersed therein. The viscosity of the viscous medium is suitably increased by cooling, polymerizing, crosslinking, or any combination thereof, the viscous medium after the viscous medium after the nanoparticles are dispersed therein and before any appreciable nanoparticle dispersion ensues thus resulting in much higher viscosity or even a solid material which will be stable. Because of the nature of polymers, resin mixtures can be characterized as quasi-stable or unstable, therefore stability can be achieved using a high viscosity medium to prevent particle movement.

In another aspect of the present invention there are provided processes of dispersing particles in a viscous fluid such as a polymeric fluid. These processes include providing an particle solution comprising solvent, particles, and optionally polymer, the particle solution being characterized as comprising well dispersed individual particles and the solvent characterized as being more soluble in water than in the polymeric fluid; continuously contacting droplets of the particle solution with the polymeric fluid in a droplet contact zone to form a mixture comprising the particles, the solvent, and the polymeric fluid; transporting the droplets of particle solution away from the droplet contact zone, the transported droplets being richer in solvent exterior to the droplet zone, the particles and polymer entering the polymeric fluid; and contacting the polymeric fluid with an aqueous phase at an interface zone located exterior to the dispersion zone while simultaneously extracting at least a portion of the solvent out of the viscous fluid.

The solvent can be in the form of a liquid, gas, super critical fluid, or any combination thereof. The solvent being characterized as a good solvent or suspending agent for the particles. The solvent, or a portion thereof, can be removed from the mixture by evaporation using any solvent removal method known in the art, for example extraction, evaporation, reverse osmosis membrane filtration, ultrafiltration, distillation, absorption, and the like. In addition, a solvent portion of the particle solution can be removed from the mixture by phase separation of the solvent with the viscous fluid. This can be carried out by judicious choice of the first and viscous fluid or by altering the physical conditions of the mixtures to induce phase separation.

The viscous fluid suitably comprises curable polymer resin, non-curable polymer resin, or any combination thereof. The viscous fluid is typically of different overall composition than the particle solution. For example, the viscous fluid can comprise one or more monomers, which can be post-cured or post-polymerized after dispersion to give rise to polymeric particle dispersed composite materials. Likewise, the viscous fluid may include one or more monomers, oligomers, polymers, one or more solvents, a mixture of two or more solvents, one or more polymer additives, such as plasticizers or impact modifiers, or any combination thereof.

Good dispersion can be aided by subjecting the particles in the process to a form of mechanical vibration, agitation, stiffing, mixing, and the like. For example, at least a portion of the mixture can be vibrated during all or part of the method at a frequency in the range of from about 1 Hz to about 10,000 kHz. At least a portion of the mixture can be agitated with mechanical agitation during all or part of the method at a frequency in the range of from about 1 Hz to about 10,000 kHz for oscillatory type mechanical agitation or from about 1 to about 5,000 RPM for rotational type mechanical agitation. In addition, at least a portion of the mixture can be mixed by magnetic stirring during all or part of the method at a frequency in the range of from about 1 to about 1,000 RPM.

At least a portion of the mixture can be sonicated during all or part of the method at a frequency in the range of from about 1 Hz to about 10,000 KHz, typically at a frequency in the range of from about 10 Hz to about 6,000 KHz, or at a frequency in the range of from about 20 Hz to about 200 KHz. Typically at least a portion of the mixture can be sonicated during all or part of the method at an acoustic power in the range of from about 0.01 W/cm2 to about 1000 W/cm$^2$. When sonication is used, at least a portion of the mixture can be sonicated during all or part of the method at an acoustic power in the range of from about 0.01 W/cm2 to about 50 W/cm$^2$, or in the range of from about 0.01 W/cm$^2$ to about 2 W/cm$^2$. The mixture can be sonicated while removing at least a portion of the solvent from the mixture.

The solvent can be removed from the mixture using evaporation, vacuum, inert gas streaming, steam streaming, dry air, forced dry air, baking, rotary evaporation, vacuum, a co-solvent, streaming inert gas, streaming steam, fractionation, centrifugation, solvent trapping, ultra-centrifugation, ultra-sedimentation, electrophoresis, chromatography, fractionation using selective filtration, steam distillation, using an air/ozone mixture solvent, using one or more co-solvents, by adjusting the pH of an extracting solvent, by changing the ionic strength of an extracting solvent, by the use of one or more phase transfer catalysts, by use of emulsion particles dispersed in an extracting phase characterized as having an affinity for the solvent, or any combination thereof. When extraction is used, a suitable extracting phase comprises water.

The particle solution is suitably added to within the viscous fluid drop-wise, stream-wise, pulsed, by use of gravity, syringe pumps, fluid pumps, peristaltic pumps, vacuum pumps, or any combination thereof. In addition, the process may also include adding a curing agent to the particle solution to the viscous fluid to the mixture, or any combination thereof. A suitable curing agent can be activated by visible light, ultraviolet light, heat, radiation, or any combination thereof, which can be added at any stage during the process. For example, a suitable curing agent can be added after essentially all of the solvent is removed.

Suitable curable polymer resins that can be used in the processes of the present invention include thermally-curable polymer resins, radiation-curable polymer resins, or any combination thereof. Suitable thermally-curable, thermosetting, or thermoplastic polymer resin includes one or more of: an epoxy resin, a polyester resin, an acrylic resin, a polyimide resin, a polyamide resin, a polycarbonate resin, an alkyd resin, a polyamine resin, a methacrylic resin, UV curable resin, a melamine resin, an urea-formaldehyde resin, an epoxy-ester resin, a polyisocyanate resin, a hydrocarbon resin, a adiabatic acid resin, a pine rosin resin, a tall oil resin, a dehydrated castor oil resin, a tung oil resin, a polyketone resin, a polyurea resin, a cyanurate ester resin, a waxy resin, a silicone resin, a silane resin, a vinyl butyral resin, a vinyl acetate resin, a hydrolyzed vinyl acetate resin, a polybutene resin, a Ziegler-Natta catalyzed resin, a polyisothiourea resin, polyalkane resin, polyvinylchloride resin, polyethlyene terephthalate resin, high density polyethylene resin, low density polyethylene resin, polypropylene resin, polystyrene resin, ABS resin, PEEK resin, Nylon 6,6 resin, Nylon 6 resin, Nylon 6,10 resin, Nylon 11 resin, Nylon 6/12 resin, amorphous Nylon resin, Nylon 12 resin, Nylon 4/16 resin, impact-modified Nylon 6,6 resin, styrene acrylonitrile resin, acetal resin, phenol-formaldehyde resin, melamine-formaldehyde resin, urea-formaldehyde resin, polysulfone resin, polybutylene terephthalate resin, polyurethane thermoplastic elastomeric resin, polyphenelyne sulfide resin, polyethersulfone resin, polyester thermoplastic elastomeric resin, modified polyphenylene oxide resin, polyetherimide resin, rigid thermoplastic polyurethane resin, saturated styrenic elastomeric resin, olefinic thermoplastic elastomer resin, thermoplastic Vulcanizate elastomeric resin, polymethylpentene resin, perfluoroethylene resin, Teflon resin, polyvinylidene fluoride resin, liquid crystal polymer resin, fluorinated ethylene propylene resin, polyphthalamide resin, polyetherketoneketone resin, SMA resins, thermoplastic polyimide resin, polysulfone/polycarbonate alloy resin, high temperature Nylon resin, syndiotactic polystyrene, polytrimethylene terephthalate resin, and the like, or any combination thereof.

In the processes described herein, the curable polymer resin can be at least partially uncured while the particle solution is added. Typically the curable polymer resin remains substantially uncured while the particle solution can be added.

Any of a wide variety of particles, both nanoparticles having dimensions in the range of from about 1 nm to about 100 nm, as well as microparticles having dimensions in the range of from greater than about 100 nm to about 125 microns can be dispersed using the processes provided herein. Suitable nanoparticles may be gaseous, liquid or solid in nature. Suitable gaseous nanoparticles may be bubbles of a gas, such as air, hydrogen, nitrogen, an inert gas, a reactant such as a monomer, and the like. Suitable liquid nanoparticles include any type of liquid that is desired to be dispersed in a viscous medium, such as water, reactants, monomers, diluents, solvents, and the like. Suitable solid nanoparticles include nanotubes, quantum dot nanocrystals, metallic nanoparticles, nanotetrapods, and the like. Suitable nanotubes comprise nitrogen doped carbon nanotubes, pyrrolyzed polyacrilonitrile carbon nanotubes, boron nitride nanotubes, tungsten dioxide nanotubes, carbon nanotubes, or any combination thereof. Suitable carbon nanotubes contain fullerenes, single-walled carbon nanotubes "SWNTs", double-walled carbon nanotubes, "DWNTs", multi-walled carbon nanotubes, "MWNTs", or any combination thereof. Suitable carbon nanotubes can be functionalized or unfunctionalized. Suitable particles can include a mixture of nanotubes, for example, having greater than about 50 weight percent SWNTs, or even greater than about 95 weight percent SWNTs.

Suitable solvents useful in the present invention can be characterized as being miscible with the viscous fluid. In certain embodiments, the solvent can be capable of dispersing individual nanoparticles, for example, individual carbon nanotubes. Suitable solvents can be polar, partially polar, or non-polar. Suitable solvents can be aqueous (e.g., containing water), non-aqueous (e.g., not containing water), organic (e.g., containing a molecule comprising at least one carbon atom in its molecular formula), or any combination thereof. Suitable solvents may comprise a water miscible highly polar solvent. Suitable water miscible highly polar solvents include dimethyl formamide, dimethyl sulfoxide, gamma-butyrolactone, tetrahydrofuran, methanol, ethanol, n-propanol, isopropanol, n-butanol, iso-butanol, tert-butanol, phosphoric acid derivatives, ionic fluids, acetone, methyl ethyl ketone, methyl isobutyl ketone, ethylene glycol, propylene glycol, ethylene carbonate, propylene carbonate, n-methylpyrrolidinone, phenol, water, carbon disulfide, other highly polar solvent known to one skilled in the art, or any combination thereof. In other embodiments, the solvent comprises a water immiscible solvent. Suitable water immiscible solvents comprise toluene, benzene, xylene, tetrahydronaphthalene, decalin, dichlorobenzene, diethyl ether, critical point carbon dioxide, petroleum ether, heptane, hexane, octane, chloroform, ethylene dichloride, ethylene chloride, carbon tetrachloride, any other water immiscible solvent known to one skilled in the art, or any combination thereof.

Suitable particles used in preparing the particle solutions in the methods of the present invention comprise typically include individual particles smaller than about 125 microns in diameter, aggregates of individual particles smaller than about 125 microns in diameter, or any combination thereof. Suitable individual particles can have a particle dimension even as small as, or as large as, about 100 microns, or about 10 microns, or about 1 micron, or about 500 nm, or about 200 nm, or about 100 nm, or about 50 nm, or about 20 nm, or about 10 nm, or about 5 nm, or about 2 nm, or about 1 nm, or even about 0.5 nm. As used herein, a particle dimension may be a diameter of a spherical particle (e.g., a nanocrystal quantum dot), or the width or length of an elongated particle (e.g., a nanorod), or the diameter of a cylindrical particle (e.g., a nanotube), and the like.

Suitable particle solutions are prepared so that they are substantially free of particle aggregates. As used herein, the term "substantially free of particle aggregates" means that some particle aggregates can be present so long as their presence does not affect the properties of the particle solutions relative to an particle solution that contains no particle aggregates.

The processes according to the present invention can be used to disperse particles at very high concentrations in the viscous fluid, for example, the dispersion of particles in the viscous fluid comprises up to about 90 percent based on total weight of particles and the viscous fluid. In this regard, the concentration of the particles in the viscous fluid is increased by using a dilute polymer solution, and additionally removing solvent. Suitable particle solutions typically comprise from about 0.00001 percent to 10 percent, or at least about 0.0001 percent, or at least about 0.001 percent, or at least about 0.01 percent, or at least about 0.1 percent, or at least about 1 percent, based on total weight of particles and the solvent. Suitable the particle solution can be at least partially sonicated either part of the time or continuously, so as to maintain a suspension with a minimum of aggregated or settled particles.

Suitable particle solutions used in the processes of the present invention may further comprise one or more polymers. The total weight ratio of the dissolved polymer relative to the total weight of particles can be suitably in the range of from about 1:1 to about 1000:1, or in the range of from about 10:1 to about 100:1. Suitable polymer can be substantially the same composition as, or substantially a different composition as any polymer present in the viscous fluid.

Process temperatures used in the various methods and method steps are not critical. For example, in some embodiments, the temperature during any one or more process steps can be kept below about 25° C. In other embodiments, the temperature during any one or more process steps can be kept in the range of from about 25° C. to about 100° C., and more typically in the range of from about 30° C. to about 90° C.

Suitable particles use in the processes of the present invention may also comprise insoluble materials comprising in particles, such as alkali metals, alkaline earth metals, transition metals, other metals, metalloids, non-metals, halogens, noble gases, rare earth elements, pigments, catalysts, silica, hollow glass spheres, zinc oxide particles, aerogels, thermoplastic powders, thermoset powders, liquid crystalline compounds, or any combination thereof. Suitable alkali metals comprise lithium, sodium, potassium, rubidium, cesium, francium, or any combination thereof. Suitable alkaline earth metals comprise beryllium, magnesium, calcium, strontium, barium, radium, or any combination thereof. Suitable transition metals comprise scandium, titanium, vanadium, chromium, manganese, iron, cobalt, nickel, copper, zinc, yttrium, zirconium, niobium, molybdenum, technetium, ruthenium, rhodium, rhodium, palladium, silver, cadmium, hafnium, tantalum, tungsten, rhenium, osmium, iridium, platinum, gold, mercury, rutherfordium, or any combination thereof. Suitable other metals comprise aluminum, gallium, indium, tin, thallium, lead, bismuth, or any combination thereof. Suitable metalloids comprise boron, silicon, germanium, arsenic, antimony, tellurium, polonium, or any combination thereof. Suitable non-metals comprise hydrogen, carbon, nitrogen, oxygen, phosphorous, sulfur, selenium, or any combination thereof. Suitable halogens comprise flourine, chlorine, bromine, iodine, astatine, or any combination thereof. Suitable noble gases comprise helium, neon, argon, krypton, xenon, radon, or any combination thereof. Suitable rare earth elements comprise lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, lawrencium, or any combination thereof. Suitable catalysts comprise Linde catalyst, Raney Nickel, Wilkinson's catalyst, Fisher-Tropsch catalyst, platinum catalyst, palladium catalyst, asymmetric hydrogenation catalysts, other catalysts known to one skilled in the art, or any combination thereof.

Suitable particles may also comprise ceramic precursor powder, superconducting ceramic precursor powder, superhard ceramic precursor powder, or any combination thereof. For example, the particles may comprise minerals, powdered gems, powdered or slurry forms of ores, powdered in pigments, such as powdered pigments, powdered dyes, slurried dyes, liquid dyes, highly cross-linked resins, or any combination thereof.

Suitable particles may also include a coating additive comprising anti-settling agents, antifoam agents, degassing agents, compatibility enhancing agents, thixotropic agents, leveling agents, UV absorbing agents, fluorescent brightening agents, deflocculating agents, or any combination thereof.

Suitable particles may also comprise biologically active compounds, enzymes, cell components, DNA, RNA, lysosomes, red blood cells, white blood cells, phagocysts, viruses, retroviruses, vaccines, antibiotics, antifungicides, antimold compounds, or any combination thereof.

Suitable particles may also comprise an animal living component comprising cells, ova, sperm, stem cells, umbilical cord components, muscle tissue, collagen fiber generating cells, or any combination thereof.

Suitable particles may also comprise a one celled organism from the animal, plant, fungi, protista, and monera kingdoms as defined by the older five domain biological kingdom paradigm, or the Archaea, Bacteria, and Eukarya as defined by the newer three domain paradigm, or any combination thereof.

Suitable particles may also comprise living or previously living cell components which can be one-cellular or sub-cellular in nature but not usually viable in an isolated form comprising cells, ova, sperm, stem cells, umbilical cord components, muscle tissue, collagen fiber generating cells, brain tissue, neural tissue, blastocell tissue, or any combination thereof.

Suitable particles may also comprise a plant living component comprising seeds, spores, pollen, bacteria, cellulose fiber generating cells, chitin fiber generating cells, cotton generating cells, genetically modified plant cells, or any combination thereof.

Suitable particles may also comprise nano- or micro-sized microtaggants or other types of particles useful for identification purposes, or any combination thereof.

Suitable particles may also comprise nano- or micro-sized RFID circuits or other component useful for "at a distance" identifying, cataloging, inventory management technologies, or any combination thereof.

Suitable particles may also comprise nano- or micro-sized electronic components such as memory chips, IC chips, integrated circuits, batteries, or any combination thereof.

Suitable particles may also comprise nano- or micro-sized machines, robots, generators, or any combination thereof.

Suitable particles may also comprise animal or plant natural or modified natural fibers, such as Rayon, silk, wool, cotton, ramie cellulose, lignin, linen, hemp, jute, flax, spider silk, sinew, catgut, hair, fibers used in the manufacture of paper, fibers used in the manufacture of felt, sisal, or any combination thereof.

Suitable particles may also comprise artificially synthesized fibers, in natural or modified natural fibers, synthetic in fibers, or any combination thereof.

The processes may also comprise one or more steps of arresting dispersion of the dispersed particles, for example, freezing, solvent removal, and/or chemical reactions such as UV initiated cross-linking.

Related processes are directed to preparing a thermodynamically unstable and dynamically frustrated particle viscous mixture. These processes include providing an particle solution comprising a plurality of particles and a solvent, the particle solution being characterized as comprising essentially well dispersed individual particles, and the solvent characterized as being more soluble in water than in the viscous medium; contacting the particle solution with the fluid medium in a dispersion zone to form a one-phase mixture comprising the particles, the solvent, and the fluid medium; and contacting the one-phase mixture with an aqueous phase at an interface zone located exterior to the dispersion zone while simultaneously extracting at least a portion of the solvent out of the one-phase mixture and into the aqueous phase.

Related processes are directed to combining the processes of particle sonication to ensure dispersion of individual particles and extraction of the solvent used to disperse the particles. Accordingly, related processes for dispersing particles in an fluid medium include providing an particle solution comprising a plurality of particles and a solvent, the particle solution being characterized as comprising essentially well dispersed individual particles, and the solvent characterized as being more soluble in water than in the fluid medium; contacting the particle solution with the fluid medium in a dispersion zone to form a one-phase mixture comprising the particles, the solvent, and the fluid medium, the contacting occurring while simultaneously sonicating both the particle solution and the fluid medium in the dispersion zone; and contacting the one-phase mixture with an aqueous phase at an interface zone located exterior to the dispersion zone while simultaneously extracting at least a portion of the solvent out of the one-phase mixture and into the aqueous phase.

The processes can be further understood in reference to a discussion hereinbelow of FIGS. 1-20 in the drawings.

Generic Process to mix a DMF Dispersible Nanoparticular substance into an Oligomeric or Polymeric Material. FIG. 1 provides an embodiment of a system 100 suitable for dispersing a nanoparticulate substance into a fluid containing an oligomer or polymer. The system includes a syringe pump 101 powered by standard power outlet. Additive tube 102 can be inserted into the system through an opening on the resin kettle top 103 and connected to syringe pump 101 and ending at a tip 120 near the bottom of reactor kettle 104 in kettle bottom region 130, where it can be submerged in phase 112.

In one embodiment, phase 112 can include a curable material and an optional non-curing material, such as a solvent or a polymer. A suitable example includes an epoxy material, DMF solvent and trace water. Other suitable curable materials and fluid phases are described further herein. Aqueous phase 111 can be of lower density than phase 112. Aqueous and phases generally remain phase separated, with the aqueous phase typically above phase 112. Sometimes the aqueous phase can be higher density than the phase, the aqueous phase can then be below the phase. Aqueous phase 111 typically includes water and other components, such as solvent, a portion of the phase and other useful additives, such as surfactants, emulsifiers and the like, as well as contaminants. In one embodiment the aqueous phase includes water, DMF, emulsified epoxy and water soluble contaminants. In a closed system, the addition of phase 112 to the system through additive tube 102 increases the amount of material in the system 100, reduces the volume of head space 110. A suitable inert gas, such as nitrogen, helium or argon, typically can be present in the head space 110. Accordingly, as the head space volume can be reduced, it's pressure may increase. An optional gas port 109, for example a hypodermic needle, can be inserted through the resin kettle top 103 and into the inert gas phase 110 to control pressure. In some embodiments, it can be envisioned to operate the system with the head space composed of primarily vapor from the aqueous phases.

Mechanical stirrer 105 stirs the aqueous phase 111. It can be inserted into the system through the top of the resin kettle 103 and can be powered by a standard outlet. Mechanical stirrer 106 stirs phase 112 by means of magnetic forces, powered by magnetic table top stirrer 108. Other methods of stirring can also be used as know in the stiffing art.

Resin kettle bottom region 130 can be suspended in a sound transmissive fluid 113, which typically can be heated. Suitable sound transmissive fluids include water. Temperature of the sound transmissive fluid 113 can be controlled using a suitable heater (not shown). Suitable temperatures are in the range of from about 30 degrees Celsius to about 120 degrees Celsius, or from about 40 to about 100, or from about 50 to about 90 degrees Celsius. Water can be a typical sound transmissive fluid and can be readily heated to 85 degrees Celsius. Temperatures higher than the normal boiling point of water can be achieved using pressurized systems with water or by use of higher boiling, preferably non-flammable solvents that are known in the art. The sound transmissive fluid 113 suitably fills variable frequency sonicator 107.

A process of the current invention can also be described with reference to FIG. 1. The vessel can be a resin reaction kettle with a standard kettle top. The kettle can be made from any of the usual materials. If the kettle can be made from glass, the addition process can be easily monitored from the outside by visual inspection. The kettle contains two phases: The upper phase can be water and the lower phase can be a resin with a density greater than that of water. The kettle also has stiffing in the bottom layer via magnetic stirring. The top layer has a mechanical stirring apparatus situated so that the upper phase can be agitated without unduly disturbing the phase boundary. The kettle also has stiffing in the bottom layer via magnetic stirring. Stirring aids the diffusion of the added droplets to form a homogenous mixture throughout the resin phase and to increase the rate of upward diffusion of the components miscible with the upper phase. Mechanical stirring in this layer aids a continuous refreshing of the upper phase interface with liquid that is not saturated with the substances that are being removed from the lower phase (water soluble components in this generic example). This can be a batch process where the overall level increases in height as the entire volume of the liquid increases in proportion with the volume added. To avoid overflow, the upper layer can be partially removed periodically. To limit the concentration of non-water components in the upper phase, some of the removed layer can be periodically replaced by water.

The Ultrasonic Temperature Controlled Bath. FIG. 1 shows the kettle partially immersed in a variable frequency heated ultrasonic water bath (i.e., sonicator). The water level of the ultrasonic bath can be approximately the same level as the bottom phase contained in the interior of the resin reaction kettle so that the ultrasonic energy can be evenly dispersed at a maximum throughout the resin phase and at a minimum throughout the water phase. The heater also allows the temperature to be lowered or raised allowing a working temperature range of 0° C. to 100° C. The variable frequency ultrasonic bath allows any frequency or frequency sweep to be used, allowing the process to be optimized as to speed and quality of eventual dispersion, depending on the composition and concentration of the different components.

Addition and Gas Removal Tubes. Entering the top of the resin kettle in FIG. 1 can be a tube whose exit can be near the bottom of lower resin phase. This tube allows the drop-by-drop addition of a solution (which has particles or dissolved substances in it) directly to the resin phase. In this generic example the solvent used can be water-soluble and the particle can be water-insoluble. The mixing of the lower phase results in a rapid diffusion of the solution drops throughout the phase rapidly followed by diffusion across the interface into the water phase. The upper phase then can be initially composed of mainly water but soon can be a mixture of water, the water-soluble solvent removed from the lower phase, and any other water-soluble component which can be contained in the lower phase. It should be noted that the composition of the lower phase also contains small amounts that are similar in composition to the changing upper phase. That can be, the lower resin phase also contains small amounts of water-soluble components such as the drop solvent. The second tube allows gas pressure generated by the addition of material to the resin phase to be continuously bled off, thereby avoiding any pressure build up beyond a desired level. In some cases high pressure can be desirable, for example, if the substance being added to the resin can be gaseous at ambient temperatures.

Figure 2:
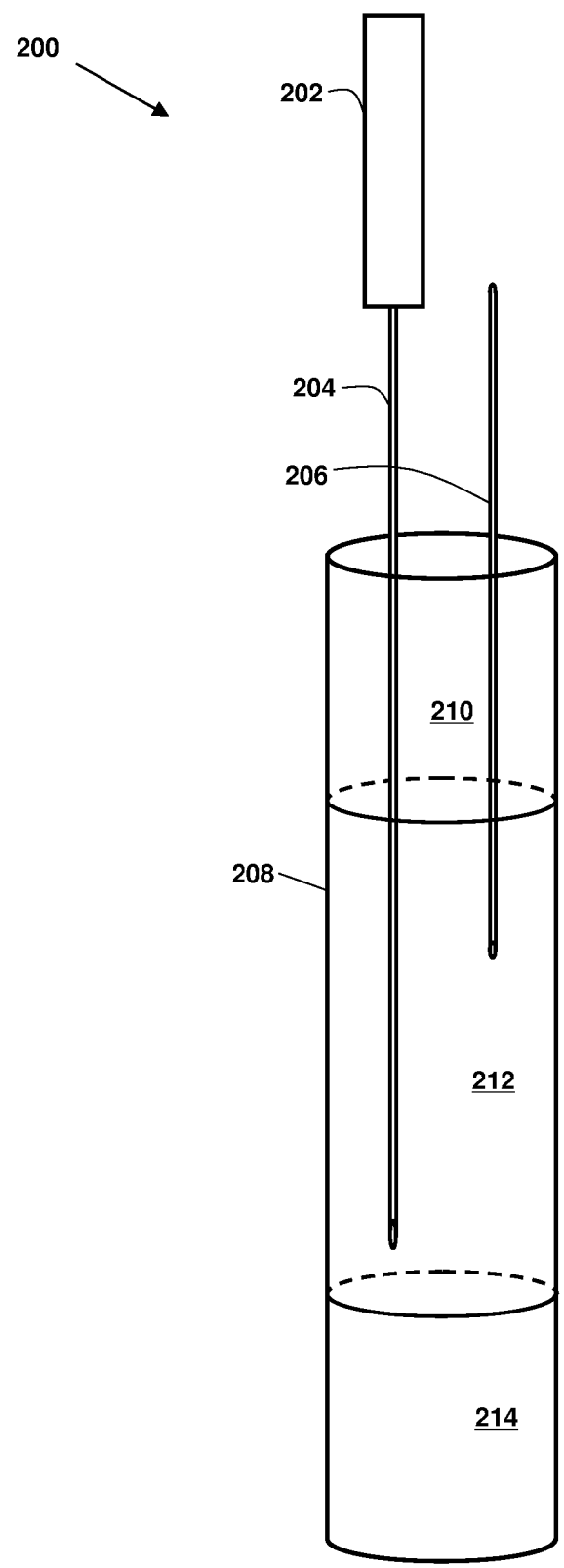
FIG. 2 illustrates a system and method useful for carrying out an embodiment of the present invention including continuous particle dispersion in an phase and extraction by an aqueous phase.

Method for Continuous Processing to Automate the Addition and Removal of Solutions. FIG. 2 provides an embodiment of a system 200, which is useful for carrying out a process of the present invention, and suitable for a continuous batch processing method of the system 100 illustrated in FIG. 1. The system can be contained in a resin kettle 208 and includes a reversible flow pump 202 powered by a standard power outlet. The pump 202 connects to the system through additive tube 204 which has additive tip 214 submerged into the aqueous phase 212. Water can be refreshed in the aqueous phase via the water refresh tube 206, which keeps the concentration of aqueous phase relatively stable. Head space 210 typically includes an inert gas, although it can contain substantially water vapor, phase vapor, or both. The system can be turned from a batch process to a continuous process by using a pumping mechanism to regulate the volume of the phase 214. This embodiment, for example, shows an illustration of the setup from FIG. 1. The input and pressure relief tubes are omitted for simplicity. The longer tube represents an addition tube, which allows water to be added to the upper phase. The shorter tube allows the removal of the complex upper phase mixture. If the rate of removal can be equal to the sum of the addition rates of added water and added solution (not shown in this FIG) then the overall level of the mixture remains the same. Thus the system consists of an upper phase whose composition remains relatively constant and a lower phase whose composition only varies by increases in the concentration of the particle which was originally dispersed in the solvent.

Figure 3:
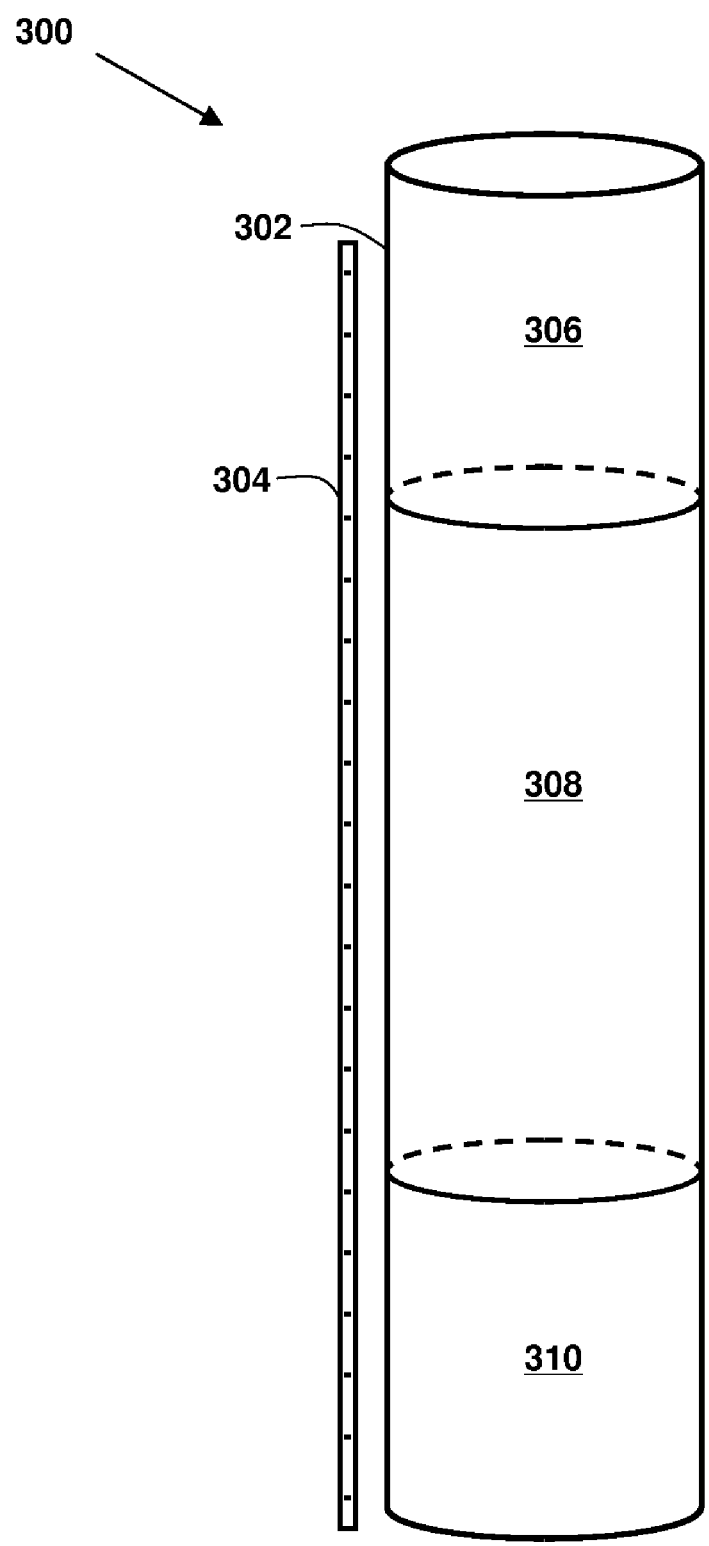
FIG. 3 illustrates a system and method useful for measuring and monitoring an embodiment of the present invention.

Method for Measuring and Monitoring of Process. FIG. 3 provides an embodiment for a measurement process system 300 suitable for monitoring the batch or continuous production systems illustrated in the system 100 and system 200. The resin kettle 302 contains an inert gas blanket 306, aqueous phase 308, and phase 310. Given the known volume of the resin kettle, monitoring of the process can be accomplished using a ruler 304 to monitor changing levels of height of the aqueous phase 308 and the phase 310. Using volume addition calculations in site dynamic concentrations of system can be monitored and documented by changes in height. Automated fluid monitoring systems can be implemented by those skilled in the art of solution process monitoring. This embodiment, for example, shows an illustration of the setup from FIG. 2. All tubes are missing to simplify the illustration. The upper most level of the phase can give the observer the ability, by measurement by a ruler, to calculate the total volume of both phases by geometry. Likewise, the measurement by ruler of the lower phase gives the total volume of the resin phase. Subtraction of the measured total volume from the measured lower phase volume gives a calculated upper phase volume. This allows the operator to directly monitor the efficiency of the process depending on the efficiency of the removal of added solvent. That can be, as the added solution can be added very slowly, the removal of solvent to the water phase should be very fast, resulting in an increasing total volume but no change in lower phase volume. As the addition drop rate can be increased, there can be an addition rate, which can cause the lower phase volume to increase. This can be the addition rate, which exceeds the removal rate of the solvent by the water phase. At this rate or above, the water-soluble solvent starts to accumulate in the lower phase, since it is not removed fast enough by the water phase. This volume can be easily measured by the previously mentioned ruler method. The lower phase volume subtracted from the original volume can equal the additional solvent that has accumulated in the lower phase.

Embodiment Featuring Fast Agitation and Aqueous Phases

Figure 4:
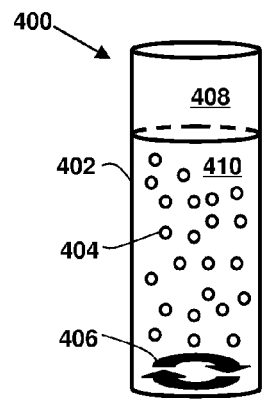
FIG. 4 illustrates a system and method useful for carrying out an embodiment of the present invention involving fast agitation of and aqueous phases.

FIG. 4 provides an embodiment for a system 400, which is useful for carrying out a process of the present invention, which represents a variation of system 100 and 200. System 400 can be comprised of a resin kettle 402 containing an inert gas phase 408 and a continuous aqueous phase 410. The continuous aqueous phase 410 has a mechanical stirrer 406 at the bottom which provides fast agitation. The fast agitation turns the phases 112 (FIG. 1) and 214 (FIG. 2) from a continuous phase into droplets 404. Sonicator not shown.

Different phase geometries and agitation methods are provided in FIG. 4, which shows different phase geometries and agitation methods. This can allow greater flexibility in the types of particles and/or resins which can be mixed by the invention.

Rapid Agitation. FIG. 4 depicts an embodiment of very rapid agitation relative to the previously mentioned embodiments that illustrate very slow agitation. The result can be similar to what one would obtain for an emulsion process with the emulsion droplets being composed of particles plus solvent surrounded by a continuous water phase. The disadvantage of using such high agitation rates would be that addition of more particle solution would be very difficult, as they would tend to form emulsion droplets themselves, with little mixing with the already existing emulsion droplets. The advantage would be that high agitation may give rise to the maximum total interfacial area, since the particles are small with a corresponding large surface area to surface volume ratio. This extreme would give the highest theoretical diffusion rate of the water-soluble solvent into the water phase. FIG. 4 shows a schematic of the structure of the mixing apparatus under the two extremes of agitation, namely high agitation and no agitation.

Intermittent Agitation. The process can be accomplished using alternating periods of high and low rates of agitation. Solution addition would in this case be limited to the periods of low agitation. Thus, using this method, speed of addition could be increased, as the rate of extraction of the solvent can be increased substantially by the high agitation periods. The invention also covers all rates of agitation envisioned as well as the algorithm of mixing used. The use of computer programmable agitation and addition equipment would make this process as facile as the simpler addition and agitation examples given earlier.

Interfacial Geometry. FIG. 4 also shows a number of interfacial geometries envisioned with the invention including batch process as well as continuous processes. Vessels with relatively large interfaces can have the advantage of fastest solvent extraction, all other things being equal. A disadvantage can be that intermixing of the two phases can also be greatest. Vessels with smaller interfaces can have the disadvantage of slower solvent extraction, but the advantage that interfacial mixing with be minimized. Long, transparent, cylindrical vessel geometry can allow for more accurate volume measurement since the error inherent in the height measurement can be reduced compared to shorter vessels. Funnel shaped vessels can provide easier removal of portions of the lower phase with little intermixing with the upper phase. This could be done to make a semi-continuous process or to remove small samples to monitor the progress of the dispersion by other analytical instrumental means.

Embodiment Featuring Minimal Agitation with Larger Phase

Figure 5:
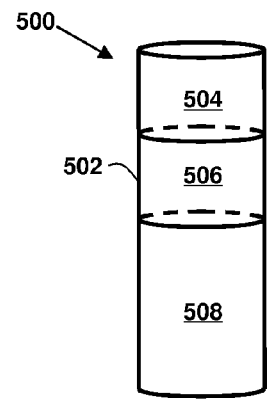
FIG. 5 illustrates a system and method useful for carrying out an embodiment of the present invention involving minimal agitation with a relatively large phase.

FIG. 5 provides an embodiment for a system 500 which represents a variation of system 100 and 200. System 500 can be comprised of a resin kettle 502 containing an inert gas phase 504, a continuous aqueous phase 506 and phase 508. System 500 contains a larger phase 508 as compared to the phases 112 (FIG. 1) and 214 (FIG. 2).

Figure 11:
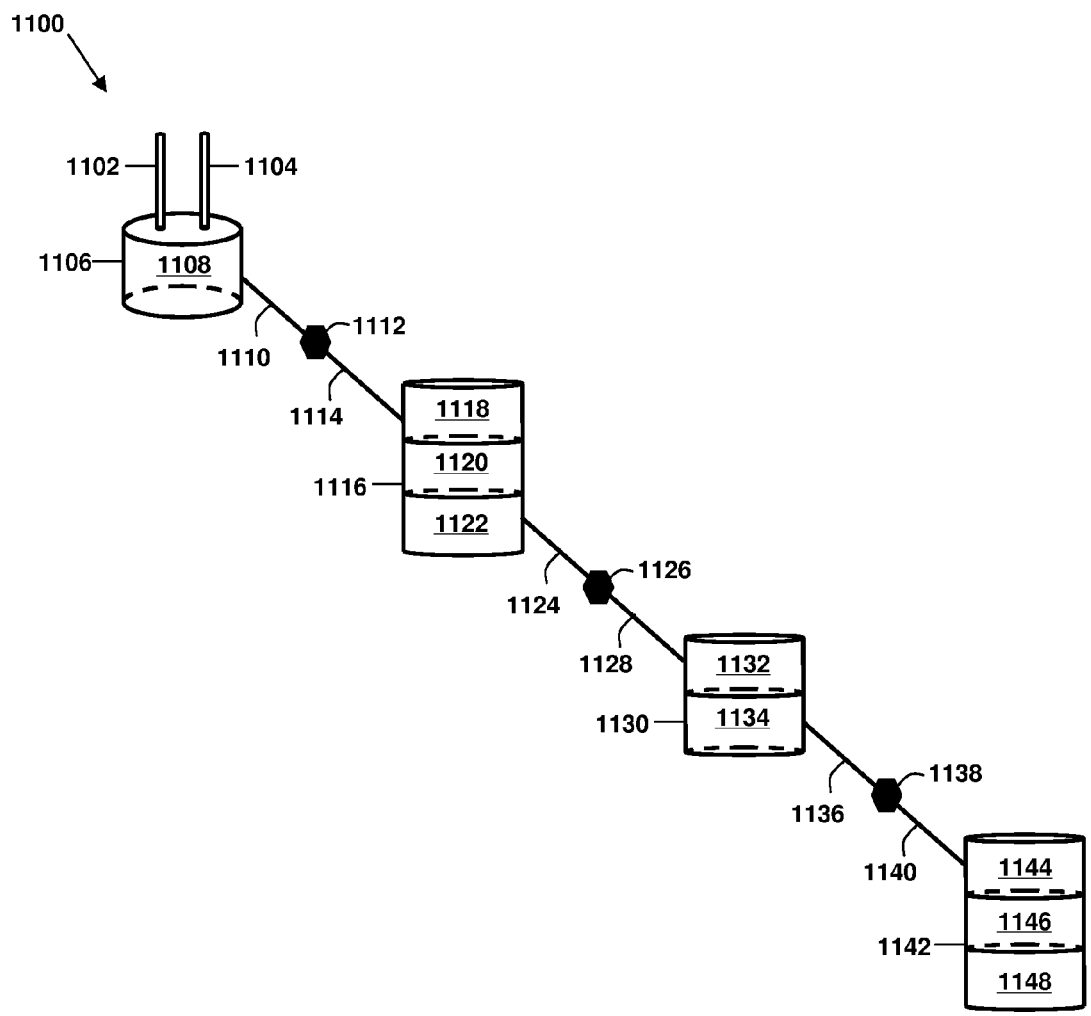
FIG. 11 illustrates a system and method useful for carrying out an embodiment of the present invention including a cascading continuous process using a plurality of kettles.
Figure 12:
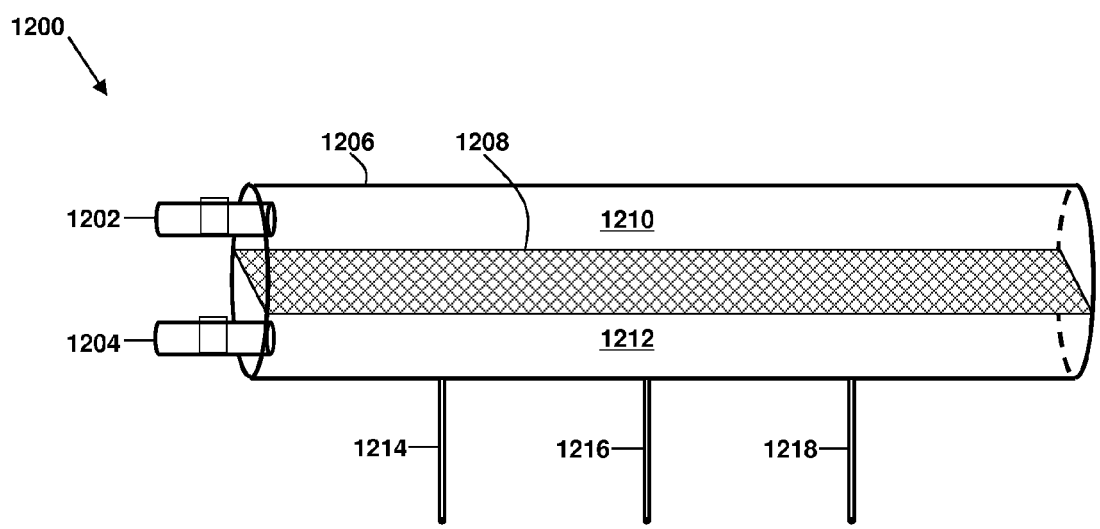
FIG. 12 illustrates a system and method useful for carrying out an embodiment of the present invention involving a continuous process having aqueous and phases separated using a porous material.

Continuous Processes. FIGS. 11 and 12 shows two vessel configurations for continuous process in contrast to the batch type process outlined previously.

Vessels in Series. FIG. 11 illustrates an arrangement which can comprise a series of vessels connected at the bottom where each succeeding vessel has a resin phase that can be more concentrated (has less solvent). Each vessel has geometry that changes to increase the rate of diffusion of the extracted solvent into the water phase. It should be noted that each vessel has only the lower resin phase added to each succeeding vessel. The water phases remain in their respective vessels.

Vessels in Parallel. FIG. 12 illustrates two continuous vessels operating in parallel. In this example the two phases remain in contact throughout the vessel with no agitation and a lamellar flow direction parallel to the pipe direction. Additions of particle-solvent solution are made into the resin phase along the pipe. As the resin proceeds down the hydraulic pathway, the particle concentration increases. By attaching the exit to the beginning of the pipe, this process may also be easily converted into a closed-loop, batch process.

Embodiment Featuring Minimal Agitation with Larger aqueous phase

Figure 6:
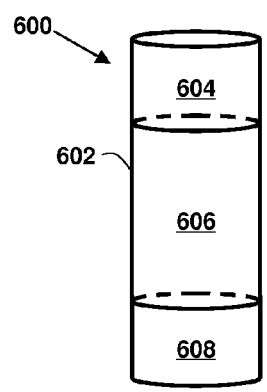
FIG. 6 illustrates a system and method useful for carrying out an embodiment of the present invention involving minimal agitation with a relatively large aqueous phase.

FIG. 6 provides an embodiment for a system 600 which represents a variation of system 100 and 200. System 600 can be comprised of a resin kettle 602 containing an inert gas phase 604, a continuous aqueous phase 606 and phase 608. System 600 contains a larger aqueous phase 608 as compared to the aqueous phases 111 and 212.

Multiple Phase Systems and Complex Stirring Geometries. FIGS. 5-8 illustrate systems with more than two phases or complex stiffing regimes.

Multiple phase systems. The invention need not be constrained to only two phases. FIG. 6 shows a possible three-phase system. The three phases are immiscible in each other. Components in the middle phase which are soluble in either the upper or lower phase can be extracted out. Another example would comprise an upper phase of aliphatic epoxy resin with a density lower than water, a middle phase of water, and a lower phase of epoxy resin with a density greater than water. Solutions could then be simultaneously added to the top and bottom phase, with water-soluble components being removed from both the upper and lower phases also simultaneously by the inner water phase.

Figure 14:
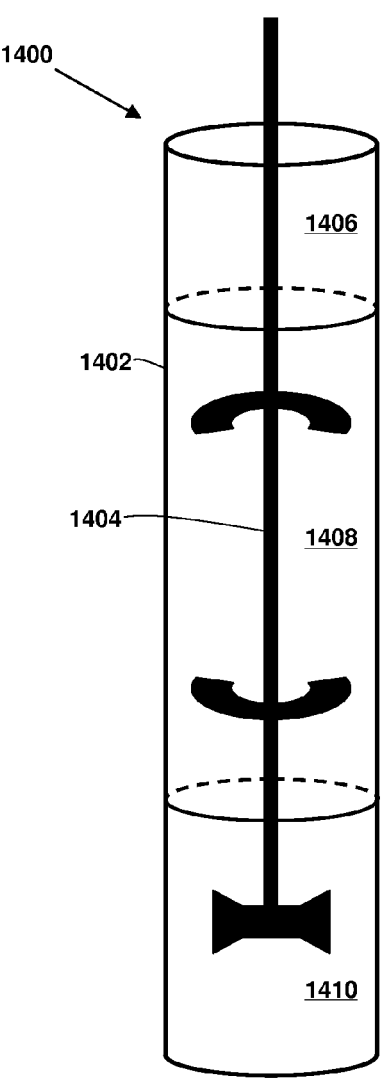
FIG. 14 illustrates a system and method useful for carrying out an embodiment of the present invention illustrating various stiffing mechanisms for the aqueous and phases.

Complex Stirring Configurations. FIG. 14 shows an example of a more complex stiffing geometry that can be used. The mixing blades can be attached via a common stirring rod and the amount of vertical versus horizontal agitation can be manipulated to effect the desired amount of mixing. In the example shown, up and down agitation can be maximized in the upper water phase. Up and down agitation can be minimized in the lower resin phase and sideways agitation can be maximized.

Embodiment Featuring Smaller Resin Kettle Diameter

Figure 7:
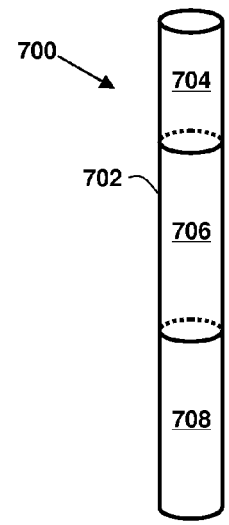
FIG. 7 illustrates a system and method useful for carrying out an embodiment of the present invention including a more narrow kettle than used in other embodiments.

FIG. 7 provides an embodiment for a system 700 which represents a variation of system 100 and 200. System 700 can be comprised of a resin kettle 702 containing an inert gas phase 704, a continuous aqueous phase 706 and phase 708. The resin kettle 702 of system 700 can be narrower in diameter as compare to the resin kettles 104 and 208 which results in a smaller interface between the aqueous phase 706 and phase 708.

Figure 15:
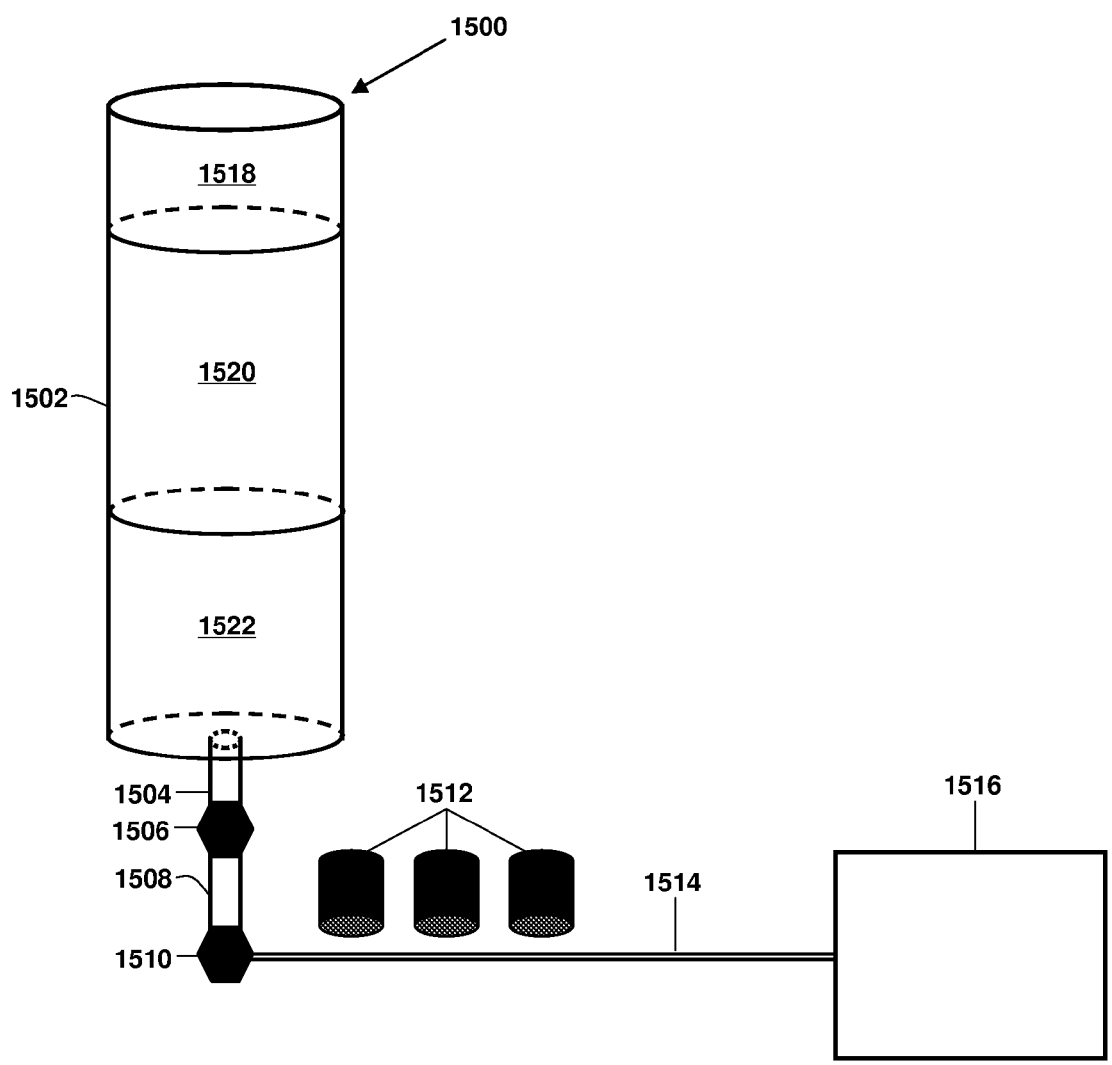
FIG. 15 illustrates a system and method useful for carrying out an embodiment of the present invention involving the production of a fiber comprising imbedded oriented carbon nanotubes.

Suitable Apparatus for the Fabrication of Continuous Thread or Wire. FIG. 15 shows an apparatus configuration for the fabrication of long rod structures as would be useful in the manufacture of thread or wire.

Embodiment Featuring Larger Resin Kettle Diameter

Figure 8:
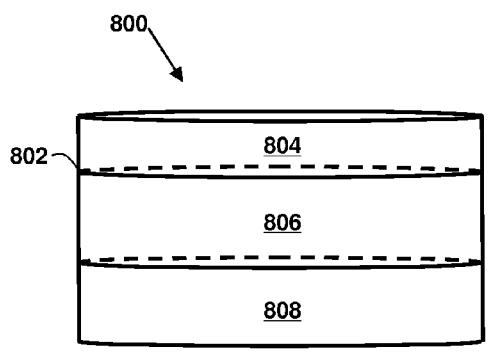
FIG. 8 illustrates a system and method useful for carrying out an embodiment of the present invention including a wider kettle than used in other embodiments.

FIG. 8 provides an embodiment for a system 800 which represents a variation of system 100 and 200. System 800 can be comprised of a resin kettle 802 containing an inert gas phase 804, a continuous aqueous phase 806 and phase 808. The resin kettle 802 of system 800 can be wider in diameter as compared to the resin kettles 104 and 208 which results in a larger interface between the aqueous phase 806 and phase 808.

Embodiment Featuring Semi-Continuous Process with Minimal Interface

Figure 9:
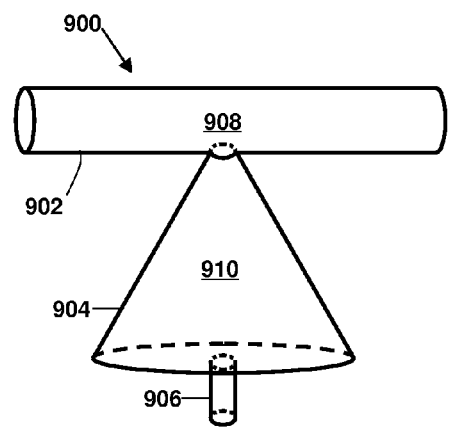
FIG. 9 illustrates a system and method useful for carrying out an embodiment of the present invention involving a semi-continuous process with minimal interface.

FIG. 9 provides an embodiment for a system 900 which represents a variation of system 100 and 200. System 900 can be comprised of a conduit 902 containing an aqueous phase 908 which would move slowly through the conduit. Resin kettle 904 can be connected at its top 912 to conduit 902 and at its bottom 914 to conduit 906 and contains an phase 910. The phase 910 interfaces with the aqueous phase 908 on the top and can be replenished on the bottom via conduit 906.

Embodiment Featuring Larger aqueous phase with Minimal Interface

Figure 10:
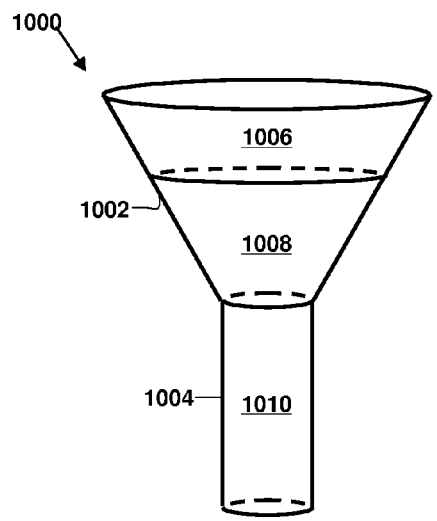
FIG. 10 illustrates a system and method useful for carrying out an embodiment of the present invention involving a larger aqueous phase compared to other embodiments having a minimal interface.

FIG. 10 provides an embodiment for a system 1000 which represents a variation of system 100 and 200. System 1000 can be comprised of a resin kettle 1002 containing an inert gas phase 1006 and a continuous aqueous phase 1008 and connected on the bottom to resin kettle 1004 which contains phase 1010.

Embodiment for a Continuous Process

FIG. 11 illustrates an embodiment of a continuous system 1100 which represents a variation of system 100 and 200. System 1100 includes conduits 1102, 1104, 1110, 1114, 1124, 1128, 1136 and 1140; resin kettles 1106, 1116, 1130 and 1143; and valves 1112, 1126 and 1138. Conduit 1102 provides an solution drip into resin kettle 1106. Conduit 1104 provides a solvent drip in resin kettle 1102. Resin kettle includes an phase 1108 (e.g., comprising a mixture of epoxy and solvent). Suitable solvents can be an compound, a particularly preferred solvent being dimethyl formamide (DMF). The phase 1108 drains into conduit 1110, which can be connected to valve 1112. Valve 1112 connects via conduit 1114 to the top of resin kettle 1116, where fluid can be capable of flowing or dripping into aqueous phase 1120 in resin kettle 1116. Resin kettle 1116 includes an inert gas layer 1118, aqueous phase 1120 and phase 1122.

Conduit 1124 connects to the bottom of resin kettle 1116, conveying phase 1122 to valve 1126. Valve 1126 connects via conduit 1128 to the top of resin kettle 1130, where phase 1122 drips into aqueous phase 1132 and passes through to phase 1134.

Conduit 1136 connects to the bottom of resin kettle 1130, conveying phase 1134 to valve 1138. Valve 1138 connects via conduit 1140 to the top of resin kettle 1142 where phase 1134 drips into aqueous phase 1144 and passes through to phase 1146. Component 1148 can be collected as the product or can be run through this process one or more times as needed depending on the desired final product.

Embodiment for a Continuous Process

FIG. 12 provides an embodiment for a system 1200 which represents a variation of system 100 and 200 and can be one possible continuous system. System 1200 includes vessel 1206 which can be separated by porous material 1208. A suitable porous material may include a mesh material, film, membrane and the like. On the top half of vessel 1206 can be an aqueous phase and the bottom half includes an phase 1212. Conduit 1202 feeds aqueous phase 1210 into the system causing aqueous phase to flow through vessel 1206. Conduit 1204 feeds phase into 1212 causing it to flow through vessel 1206. Conduits 1214, 1216, and 1218 are connected to vessel 1206 from which the phase exits. In one embodiment, the phase comprises a solution of dispersed carbon nanotubes, for example a DMF/carbon nanotube solution. Note, porous material 1208 may not be necessary to keep aqueous phase 1210 and phase 1212 separate.

Figure 13:
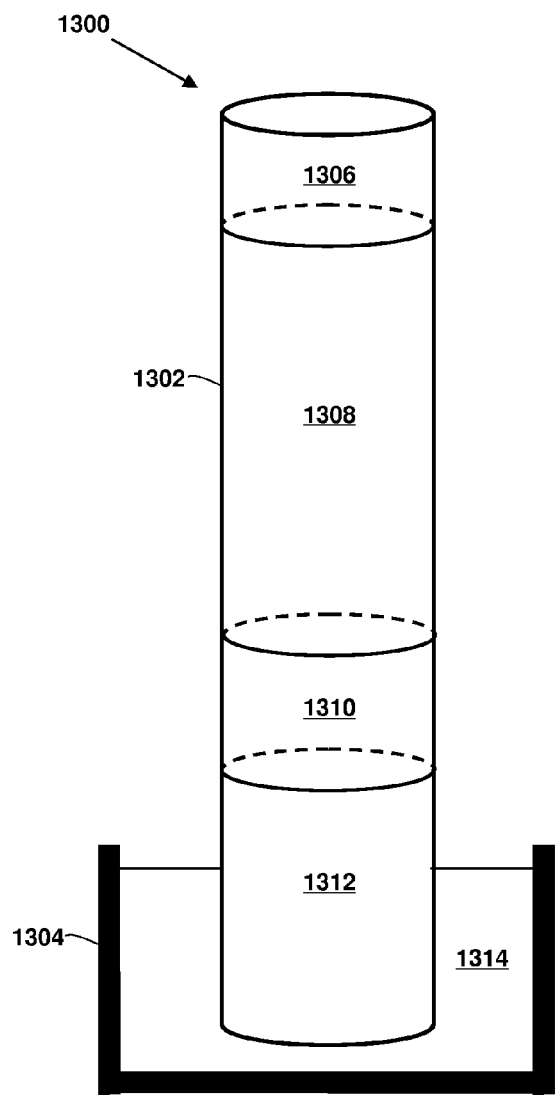
FIG. 13 illustrates a system and method useful for carrying out an embodiment of the present invention involving three liquid phases.

Method for Three Phase System. FIG. 13 provides an embodiment of a system 1300 suitable for a three liquid phase processing method of system 100 and 200. System 1300 can be comprised of a resin kettle 1302 which can be suspended in a sonicator 1304 filled with sound transmissible fluid 1314. The resin kettle contains an inert gas blanket 1306, aqueous phase 1308, and concentrate and nanomaterial phase 1310, and a separate, denser, bottom phase 1312 that corresponds to the height of the surrounding sonicating fluid exterior to the kettle.

System with Stirring Mechanism. FIG. 14 provides an embodiment of a system 1400 illustrating a possible mechanical stirring system. System 1400 can be comprised of a resin kettle 1402 and stiffing rod 1404. Stirring rod 1404 can be connected to a motor (not shown) and agitates aqueous phase 1408 and phase 1410. An inert gas blanket 1406 can be in the top of the resin kettle on top of aqueous phase 1408.

System for Producing Thread or Fiber Containing Carbon Nanotubes. FIG. 15 provides an embodiment of a system 1500 which can be a modification of systems 100 and 200. System 1500 can be used to produce graphite thread with imbedded oriented carbon nanotubes. System 1500 can be comprised of a resin kettle 1502 containing an inert gas blanked 1518, an aqueous phase 1520 and phase 1522. Resin kettle connects via conduit 1504 to valve 1506. Valve 1506 connects via conduit 1508 to pump 1510 which feed spinneret (s) 1514. Ultraviolet light sources 1512 provide the curing mechanism for the material passing through spinneret(s) 1514. Spinneret(s) 1514 feed material into chamber 1516 where the graphite material with oriented carbon nanotubes embedded within can be collected and spun into thread. Chamber 1516 may include heaters, inert gas, vacuum ports, a coagulation bath, and the like, as well as any combination thereof for use in preparing the thread using conventional thread or fiber processing technology.

Ultraviolet Cure of Resin/Particle Phase after Pressure Induced Orientation of the Dispersed Particles. The left illustration in FIG. 15 shows a schematic of a continuous process which ultimately forms a thread or wire as a final product. The first part of the process can be the formation of the particle resin dispersion (carbon nanotubes dispersed in a UV curable resin plus photoinitiator) in a manner similar to that outlined previously. The second step can be the orientation of the particle/resin dispersion via high-pressure spinnerets to form fibers, which have a high degree of orientation of the particles in the fiber direction. The solution then passes by high intensity UV light which catalyzes a cross-linking reaction that simultaneously "locks in" the orientation of the particles along the fiber direction and polymerizes and cross-links the resin to form a thread or wire which has mechanical properties sufficient for end use or sufficient for further processing, such as pyrrolyzing in a muffle-type furnace to produce a graphitic formation effect as shown in the illustration.

Pyrrolysis of the Oriented Particles via High Temperature Furnace. FIG. 15 schematically illustrates a continuous process that ultimately forms a composite carbon nanotube/graphite thread or wire. The thread formed from the left illustration could be fed by conventional wire take-up reels into a high temperature muffle-type furnace under inert atmosphere which by judicial choice of time and temperature to give rise to in a continuous matrix of graphitic material with the oriented carbon nanotubes essentially unchanged. This can give rise to a wire with the high conductivities characteristic of well-oriented carbon nanotubes dispersed in the economically advantageous but less conductive graphite. This gives a material suitable for electric power transportation over great distances, which has a balanced compromise between the highly conductive but expensive oriented carbon nanotubes and the less conductive but inexpensive graphite. The wire can be encased in an insulating polymer using technology well known in the art of wire manufacture and feed to a wind up reel for storage or transportation to a construction site.

Figure 16:
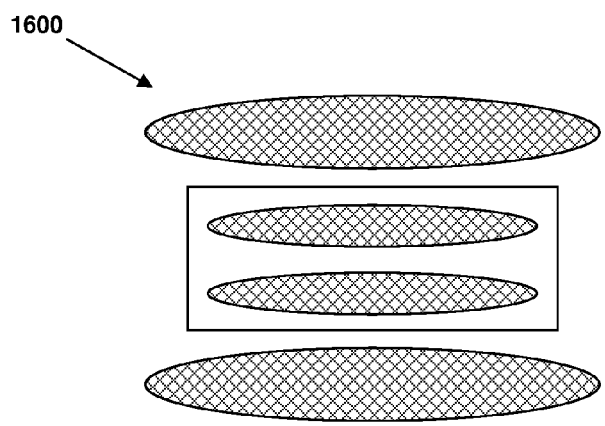
FIG. 16 illustrates a side view of an encapsulated nanotube made according to an embodiment of the process of the present invention.

Side angle View of Encapsulated Nanotube. FIG. 16 depicts a side view of an encapsulated nanotube made according to an embodiment of the process of the present invention.

Figure 17:
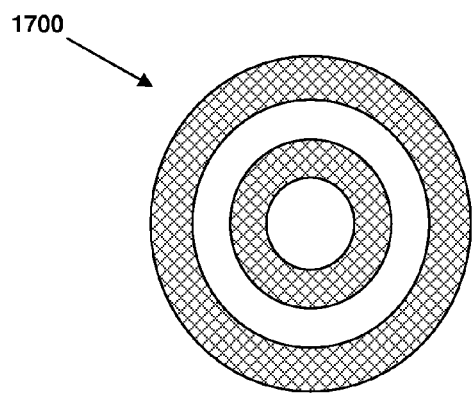
FIG. 17 illustrates a cross sectional view of an encapsulated nanotube made according to an embodiment of the process of the present invention.

Encapsulated Carbon Nanotube with Open Ends. FIG. 17 illustrates a cross sectional view of an encapsulated nanotube made according to an embodiment of the process of the present invention. Such encapsulated nanotubes can be used as a nanowire. 1702 is a polymer encapsulent, 1704 is the insulated nanotube and 1706 is a polymer layer contained inside the nanotube.

Figure 18:
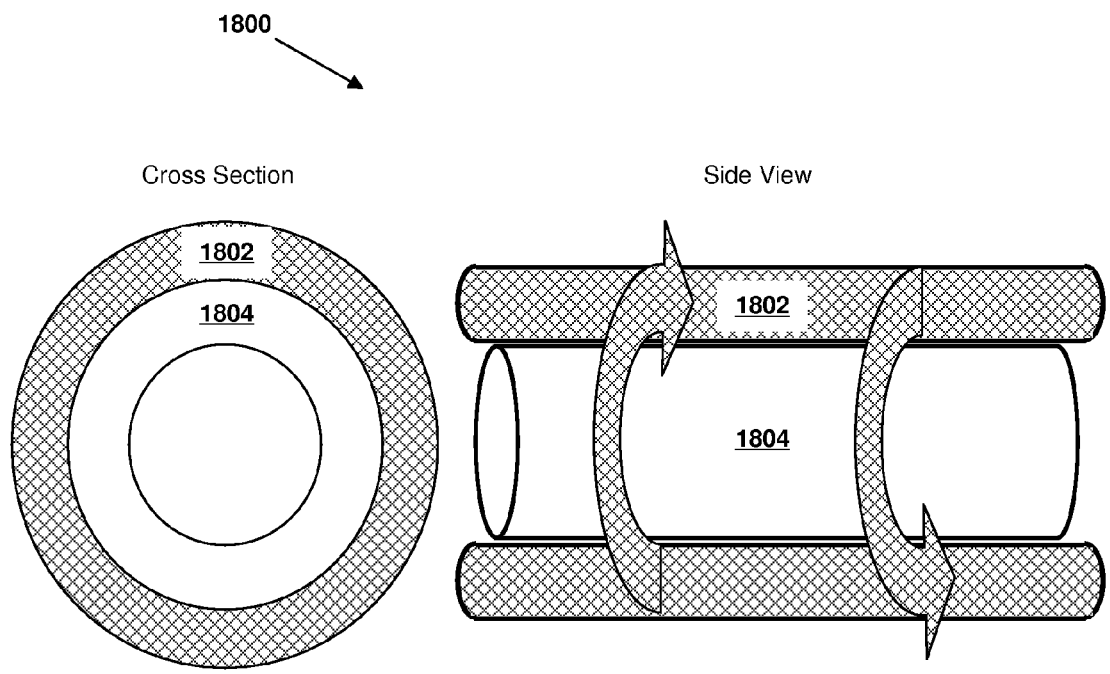
FIG. 18 illustrates a cross section and side view illustration of an example of an encapsulate particle made according to an embodiment of the invention.

Encapsulated Carbon Nanotubes Manufactured by the Invention. FIG. 18 shows two schematic views of an example of encapsulated particles. For example, FIG. 18 illustrates an encapsulated nanotube having open ends. The views illustrate a cross-sectional and sideways view of carbon nanotube 1804 encapsulated by a polymer encapsulant 1802.

Insulating Encapsulation Material. The first example shown can be encapsulated material that can be enclosed by electrically insulating material. The resulting material is suitable for nano-sized wires or super capacitor electrolytic material.

Electrically Conductive Encapsulation Material. The second example shown can be encapsulated material that can be enclosed by electrically conducting material. The result can be a material suitable for applications that require high electrical conductivities and current carrying capacities.

Figure 19:
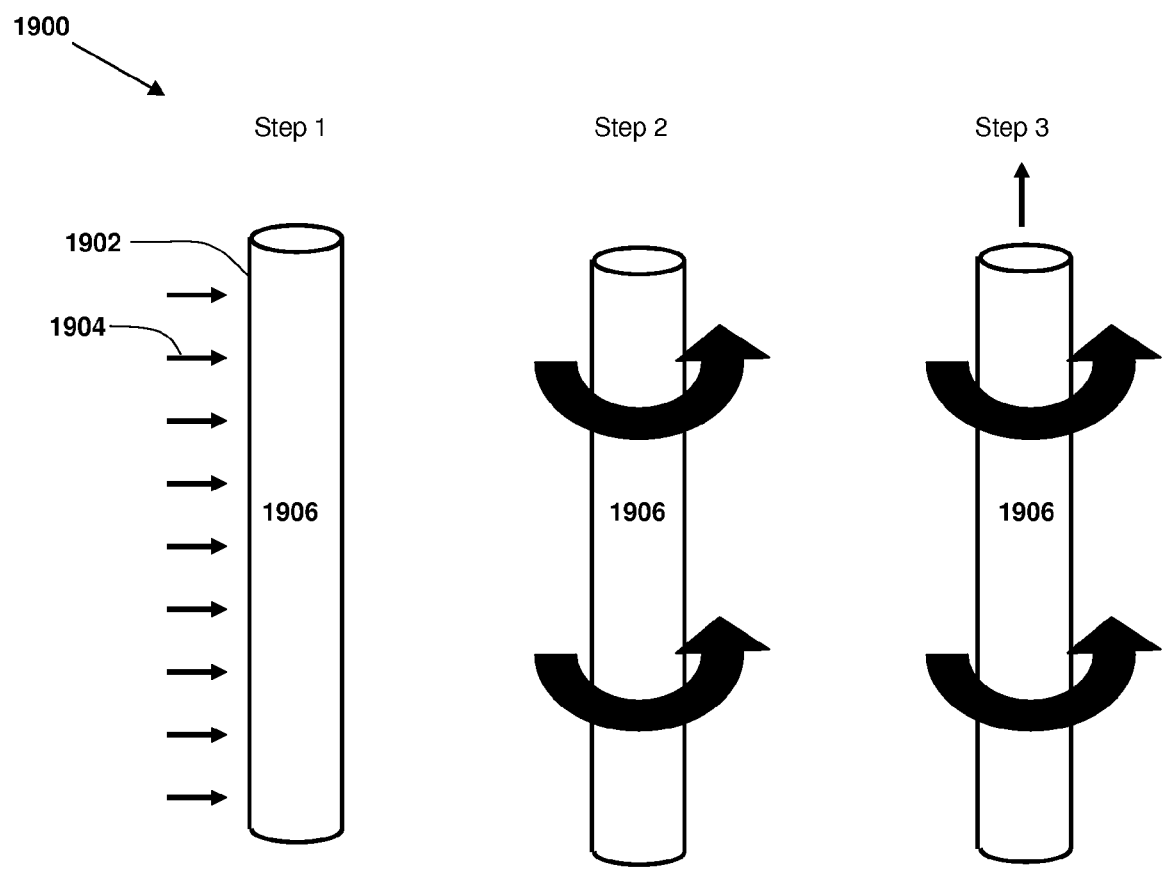
FIG. 19 illustrates IR irradiation of carbon nanotubes that are well-dispersed in a resin matrix.

Manipulation of Dispersed Nanoparticles by Heat, Light, or UV radiation. FIG. 19 shows two schematics which illustrate processes which alter the dispersion formed as previously outlined by the applications of heat (IR radiation) or UV radiation.

Irradiation of the Dispersed Particles by Heat and Light. The left illustration of FIG. 19 shows a schematic of a process that alters the process by irradiation with light and/or IR radiation. The dispersing resin can be chosen so as to minimize the absorption of IR radiation and/or light. The dispersed particle can be chosen so as to maximize the absorption of IR radiation and/or light. This can give rise to the preferential absorption of the radiation by the particle and not by the resin. Depending on the frequencies of the radiation used, the motion of the particles can be manipulated by preferential heating, controlled spinning, or tumbling of the particles.

Irradiation and Cross-Linking of the Dispersed Particles UV Radiation. The middle illustration of FIG. 19 shows a schematic of a process which alters the particles by irradiation with UV radiation to initiate cross-linking and polymerization reactions. The dispersing resin can be chosen so as to minimize the absorption of UV radiation or it can be the absorbing substance itself. If the resin is of the cationically polymerizable variety, heat generated by absorption of the particles can increase the rate of reaction in the immediate area of the particle, thus causing an in situ encapsulation of the particle by the cross-linked polymer formed by the surrounding resin.

Thermal Effects of Carbon Nanotubes Well-Dispersed in Resin. FIG. 19 illustrates IR irradiation of carbon nanotubes that are well-dispersed in a resin matrix.

Rotation of Carbon Nanotubes which are Parallel to the Plane of IR Irradiation. The left illustration in FIG. 19 illustrates IR light irradiation upon carbon nanotubes which are well-dispersed and parallel to the radiation. Due to uneven heating to the carbon nanotube itself as well as the surrounding resin on the irradiated side, a rotational motion can be generated along the carbon nanotube axis in a manner analogous to a wheel spinning about a spoke. This motion would be expected to significantly alter the nature and the degree of orientation of the nanotubes in the resin matrix. This phenomenon can be utilized to synthesis composite materials with eventual thermal properties that would be difficult to manufacture any other way.

Figure 20:
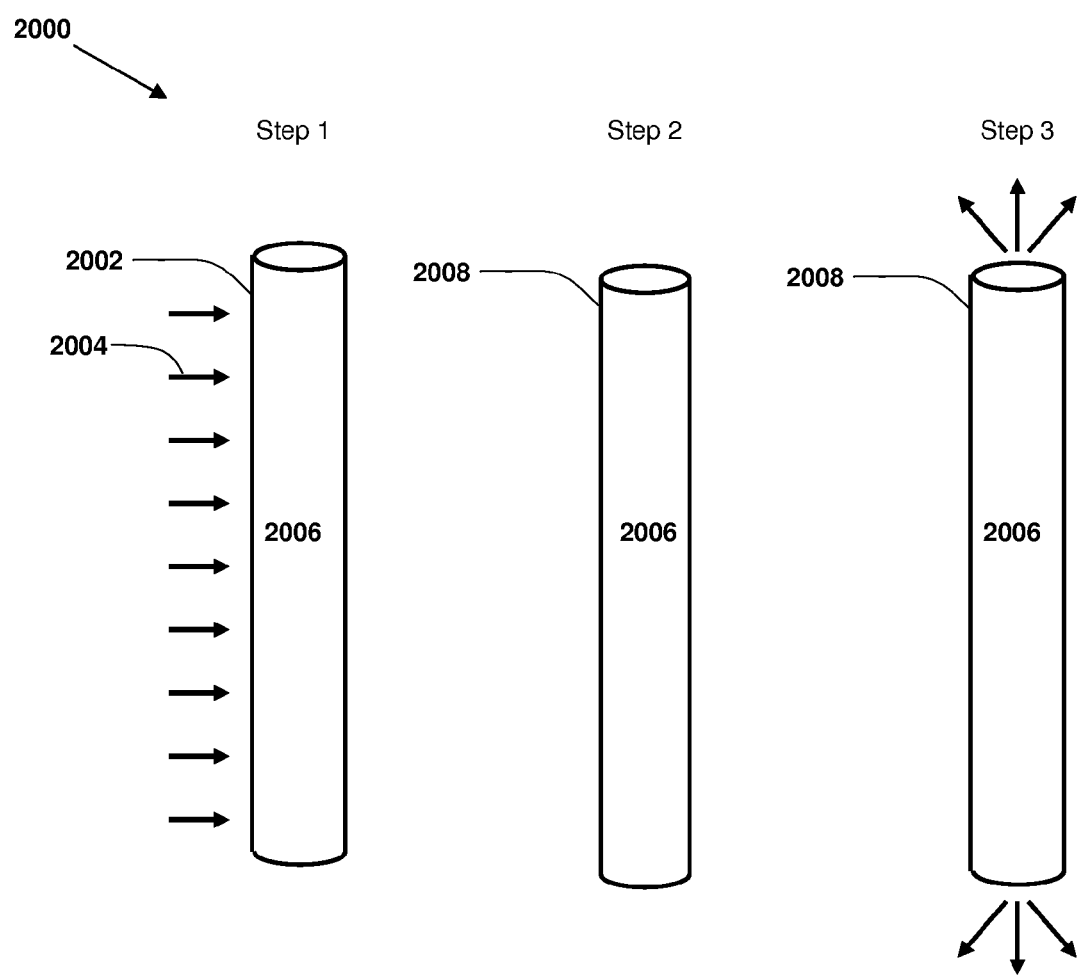
FIG. 20 illustrates a ballistic thermal conduction of carbon nanotubes normal to the plane of IR irradiation.

Ballistic Thermal Conduction of Carbon Nanotubes Which are Normal to the Plane of IR Irradiation. The middle illustration in FIG. 20 shows irradiation upon carbon nanotubes which are normal to the plane of the radiation. In this case thermal radiation can be conducted from one end of the tube to the other by ballistic conduction. This has the effect of conducting heat efficiently to different regions of the resin matrix. Carbon nanotubes which are in-between the two extremes of being normal or parallel to the plane of radiation also can conduct heat ballistically, albeit at lower intensities.

Nature of the Initial Dispersing Solution or Suspension—Initial dispersing suspension or solution. The process described by this invention begins with a preparation of the substance which can be dispersed in a desired fluid. A solution or suspension can be prepared by adding solvent on top of the powder to be dispersed at relatively low concentration. The concentration used can be the maximum that can be constructed such that the particles are either entirely dissolved and close to saturation; or they are suspended at a high enough concentration such that the particles do not, to any appreciable degree, aggregate into structures of larger diameter. This suspension can be initially formed by mixing processes well known in the art such as mechanical stirring, magnetic stiffing, vibratory mixing, high shear mixing, high speed sheer by homogenizing mixer, fixed frequency sonication, multiple frequency sonication, vibratory mixing, orbiting mixing, and shaker mixing. The particle concentration as mentioned above can be at very low concentrations as in the case of particles prone to agglomeration, all the way to relatively high concentrations as in an example of a substance which can be soluble in the solvent used. It can even be envisioned at an extreme, that some powders can be able to be used neat, thus avoiding the use of solvent altogether, if the particle size, packing characteristics, and dry flow properties are such to be amenable to the present invention.

Initial dispersing suspension or solution during process. Once the initial suspension has been formed, the suspension can be agitated periodically or continuously to keep the particles suspended and free of aggregation. The same mixing processes may simply be continued or a less invasive method or no further mixing can be employed, depending on the properties of the suspension. A true solution can have the advantage that it should require no further agitation of any kind during storage or during the next step of the process.

Particles that can be dispersed to form the initial dispersing suspension or solution. Particles (substances which are not soluble in the precursor solvent of interest) which can be used by this process are distinguished from each other mostly by average diameter and density. Particles that are close in density to the solvent can be used at just about any desired average diameter. Particles that are porous, containing many entrapped air pockets, but with a corrected intrinsic density close to the solvent, may also be used in this invention, as long as the solvating and agitation method can be facile at replacing the air pockets with the dispersing solvent. Particles which are much higher or lower in density to the solvent can limit the diameters that can be used by this invention to small enough diameters such that they can be suspended in the solvent by forces such as Brownian thermal motions as well as the applied agitation so that the particles remain sufficiently dispersed and non-aggregated as to be amenable to addition to the final dispersing fluid.

More than one type of particle can be dispersed by this procedure. More than one particle can be dispersed in the initial dispersion or in individual dispersions. The second dispersion could also use a different dispersing solvent. If an individual dispersion can be made for each type of particle, then particles could be added sequentially, which can be advantageous in many cases. Or the other extreme can be advantageous in other cases: where all of the different types of particles are added to the dispersing solvent to make one complicated "mother" dispersion.

Suitable concentrations of particles in the initial dispersing suspension or solution. The concentrations of particles that can be dispersed can range from 0% all the way to 100% depending on the goals of the process in mind. If there are no added ingredients of any kind in the initial solution, the process will not add any components to the vehicle fluid phase. This can still have an effect on the vehicle fluid, however. As the initial solution (solvent) can be added to the vehicle phase, the bulk viscosity of that phase can decrease as the concentration increases. Contaminants in the vehicle fluid that are soluble in the dispersing solvent can be preferentially dissolved. As the dispersing solvent (solution) diffuses into the extracting solvent phase, these dissolved contaminants can also be transported into the extracting solvent phase.

Solutes that can be dispersed by this method. This method need not be limited to insoluble particles, nor to substances which are solid materials at room temperature. Substances which dissolve in the precursor solvent can be used up to and beyond the solubility saturation technique by well-known super saturation techniques. As with the dispersion of insoluble particles, a maximum concentration of the substance in question can be used to minimize the amount of dispersing solvent. This can lower the cost of the process as well as lessen environmental effects of using excessively large amounts of solvent. Substances that form quasi-stable solutions with the solvent may also be used. Examples of these would include resins, oligomers, and polymers. The dispersion of a single type of particle can be described for simplicity. Applications need not be limited to a single particle, in fact, commercially viable particle/resin dispersions can comprise many additives and perhaps more than one resin. This can not appreciably change the invention as the formula in its entirety can be added to the dispersing solvent in proportion to the chosen particle, and can in the final product, depending on the individual solubilities of these additional components, also be in approximately the same proportion. This makes the process of this invention applicable to a wide array of formulations that are already utilized in commercially mature and successful products of many different types.

Density of the initial dispersing solvent. The density of the initial dispersing solvent can dominate the suspension density when the particle concentration can be relatively low. The density of the suspension should in most cases can be similar to the density of the vehicle fluid phase. This can maximize the time that the dispersing solvent has to diffuse throughout the vehicle phase which can give rise to their rapid and quantitative removal by the extracting solvent phase. Too low a density can give rise to a rapid rising of added droplets which can cause the drop to leave the vehicle phase prematurely. Too low a density and the droplet may sink to the bottom of the vessel, thus lowering mixing rates.

Miscibility of the initial dispersing solvent in the vehicle fluid phase and the extracting solvent phase. Ideally the dispersing solvent should be relatively miscible both vehicle fluid phase and the extracting solvent phase.

Viscosity of the initial dispersing solvent. The viscosity of the initial dispersing solvent should be low enough for easy processing of the fluid throughout the process. Low viscosity allows easy pumping of the suspension or solution into the vehicle fluid phase by low cost pumps.

De-gassing of the initial dispersing solvent. It can often be advantageous to de-gas the initial dispersion solvent both before forming a dispersion and after. This may easily accomplished by sonication, optionally under vacuum, while providing a means for the freed gas to escape. The gases liberated can be reactive such as oxygen, or non-reactive such as nitrogen.

Temperature of the initial dispersing solvent during dispersion. Low temperatures may typically be used since concentrations of the particles to be dispersed can often be low enough to not require high temperature. Conversely, the dispersion can be formed at high temperature if that can be advantageous, the mixture cooled then used in the next step of the process at lower temperature.

Pressure of the extracting solvent. Low pressures may easily be used desired. This can be to increase the action of de-gassing, change solubilities of the particles being dispersed, or make removal of small aliquots easy. High pressures may also be used during the formation of the initial dispersion, if for example, a gas can be purposely added to the liquid.

Initial dispersing solvent can be changed "mid-stream" to allow optimization of different particle dispersions. The dispersing solvent can be changed during the process in order to disperse a different or set of different particles. For example, a pigment particle can be easier to disperse in acetone. After this pigment can be added to the vehicle fluid and the acetone extracted out by the water phase, a second dispersion can then be added. This dispersion could be for example a leveling agent that can be more easily dispersed in tetrahydrofuran (THF). The THF in turn can then be extracted out also by the water phase, since like acetone, THF can be also water miscible.

Initial dispersing solvent can be changed "mid-stream" to extract different components from the vehicle fluid. The dispersing solvent can be changed during the process solely in order to purify the vehicle fluid. For example, acetone could be added to the vehicle fluid and the acetone and acetone soluble fractions from the vehicle fluid extracted out by the water phase. The water phase can then be totally removed and the acetone soluble fraction isolated. Then the water can be replaced and a second water-soluble solvent can then be added to the vehicle fluid. This solvent like the above example could be tetrahydrofuran (THF). The THF and THF soluble fractions in turn can then be extracted out also by the water phase, since like acetone, THF can be also water miscible. Then the THF fraction can be isolated as before. Then another water-soluble solvent can be added to the vehicle fluid, and so on with practically no limit since one need not limit themselves to water as the extracting phase. For example, diethyl ether could be used in replacement of the water as the extracting solvent, thus allowing a whole new set of solvents to be added which now only have to be soluble in diethyl ether rather than water. It can then be envisioned if one would take this to the logical conclusion, that this fractionation technique could conceivably be utilized to separate a complex fluid into all of its individual components as long as solvents which solubilize the components are used. Combine this with computerized processing equipment, this would allow for the manufacturing of an analytical instrument which could rival chromatography equipment in their power to identify unknown compounds, especially if the original compound can be composed of thousands of components.

Vehicle Fluids That May be used with the Invention The next fluid of question can be the vehicle fluid which can eventually become the continuous phase of the final dispersed product of the invention. This fluid can be in many cases, simply a vehicle which allows the dispersed particles to remain suspended for a practical shelf life, then allow facile addition of the particle to an industrial composite material.

Degree of miscibility of the vehicle fluid with the initial dispersing solvent. The vehicle fluid may have a large variety of properties with respect to the initial dispersing solvent, depending on what properties are desired in the final particle/vehicle fluid dispersion. The vehicle fluid can be miscible with the initial dispersing solvent. In this case when the initial dispersing suspension can be added to the vehicle fluid, the solvent can rapidly spread throughout the entire vehicle fluid phase, while the suspended particles can crystallize or precipitate out of solution as they are surrounded by the vehicle fluid. If the resulting particles are large enough, they can not diffuse appreciably and can form a quasi-stable suspension with the vehicle fluid.

Density of the vehicle fluid compared to the initial dispersing solvent. If the solubility of the initial dispersing solvent into the vehicle fluid can be high, the density of the solvent is not very important since it can mix rapidly with the vehicle fluid, thus not significantly affecting the overall density of the vehicle fluid. However, if the solubility of the dispersing solvent can be lower in the vehicle the dispersing solvent can not mix with the vehicle fluid and can not diffuse throughout the vehicle fluid creating a homogeneous mixture, but rather sink to the bottom if the density can be high or float to the surface if the density can be low. There can be cases where this can be desirable to make a particular end-product, but in most cases, rapid mixing of the dispersing solvent with the vehicle fluid are desirable.

Viscosity of the vehicle fluid compared to the initial dispersing solvent. The viscosity of the vehicle fluid can be high enough so that a phase boundary can be easily maintained with the extracting solvent phase, but low enough that additions of the dispersing suspension are easy and subsequent mixing of the dispersing solvent with the vehicle fluid and eventual removal by the extracting solvent can be facile and rapid.

Chemical nature of the vehicle fluid. The chemical nature of the vehicle fluid can be almost entirely dependant on the desired end use of the dispersion product manufactured by this invention. In general the desired physical properties include miscibility with the dispersing solvent as mentioned above, immiscibility with the extracting solvent (to be discussed in later sections), a relatively low viscosity under the conditions of the process, and a density that can be higher or lower than the extracting solvent (also discussed in following passages). Examples of envisioned vehicle fluids include high boiling point solvents, oligomers, polymers, and any combination of these.

De-gassing of the vehicle fluid. It can often be advantageous to de-gas the vehicle fluid both before forming a dispersion and after. This may easily accomplished by sonication, optionally under vacuum, while providing a means for the freed gas to escape. The gases liberated can be reactive such as oxygen, or non-reactive such as nitrogen. If the vessels are sonicated during the process, gases that would normally be dissolved into the fluids, would be prevented from doing so. This can give rise to a final product that can be substantially free of any gas at all.

Temperature of the vehicle fluid. Low temperatures may typically be used if the viscosity can be low enough to not require high temperature. Conversely, the dispersion can be formed at high temperature if that can be advantageous such as improved miscibility properties, enhanced purification, reduced viscosity, or any combination of these.

Pressure of the vehicle fluid. Low pressures may easily be used if desired. This can be increase the action of de-gassing, change solubilities, or make removal of small aliquots easy. High pressure can also be used which would be necessary if the dispersed substance can be a gas. In this case the fluid might be initially de-gassed under low pressure, then placed under high pressure so the newly introduced gaseous component can stay in solution.

Extracting Solvents that can be used by the Process. The process can use an extracting solvent to remove the initial dispersing solvent or suspending agent. The use of an extracting solvent is not essential to the invention. Solvent extraction can have advantages over other methods of removing the initial dispersing solvent. Other methods include removal of the dispersing solvent by rotary evaporation, diffusive evaporation, use of gaseous solvent such as critical point carbon dioxide, the use of filters, reverse osmosis, or dialysis membranes.

Miscibility of the Extracting Solvent. As mentioned above, miscibility of the extracting solvent with the initial dispersing solvent and immiscibility with the vehicle fluid is often desired to the proper functioning of the invention. Of course, miscibility and immiscibility are extremes on a reasonable scale of mixing thus in practice only relative immiscibility with the vehicle fluid and relative miscibility of the dispersing solvent in the extracting solvent are possible. It can be outlined in later passages that this relative amount of miscibility has advantages to it which are taken advantage of by this invention to make the process better in a number of ways.

Partitioning Characteristics of the Extracting Solvent. In certain embodiments, if the initial dispersing solvent can be miscible with the extracting solvent, but substantially immiscible with the vehicle fluid, the composition of the extracting phase can change during the process as more and more of the initial dispersing solvent can diffuse out of the vehicle fluid phase into the extracting solvent phase. Some of the extracting solvent can also diffuse into the vehicle fluid phase, albeit a much smaller amount depending on all of the relative miscibility's. Even in the simplest case, this partitioning can be quite complex, and can be carefully monitored to obtain the desired final product. For example, as the initial dispersing solvent concentration increases in the extracting solvent phase, the initially limited solubility of the vehicle fluid in the extracting solvent phase also increases. Thus, unless portions of the extracting solvent phase are removed and replaced by pure extracting solvent periodically so as to limit the concentration of dispersing solvent, the amount of vehicle fluid and all other components contained in the vehicle fluid phase including the particles can diffuse into the extracting solvent phase. It should be noted that this is not necessarily a disadvantage of the process of this invention. For example, if the process were intended to be one that ultimately manufactures a water-dispersible formulation, this would be very easy to accomplish by this invention using water as the extracting solvent. One would simply need to limit the amount of dispersing solvent in the extracting phase in the beginning and middle parts of the particle addition portions of the process, then as the process can be close to the desired final concentration of components in the vehicle fluid phase, one would merely need to allow the water phase to accumulate dispersing fluid to an extent where all of the vehicle fluid phase becomes emulsified. This process could also be accentuated by the addition, near the end of the process, of an emulsifying agent such as a surfactant. This surfactant would be added to the vehicle fluid in a similar manner as the rest of the components are added. The action of sonication can be sufficient agitation to give rise to a stable emulsion with good uniformity of emulsion particle size. In other cases, high speed mixing can be necessary as a final processing step to form the finished product. In any case the process can be a multi-step, but one-pot procedure.

Extracting solvent can be lower in density than the vehicle phase. In most of the examples, water can be the extracting solvent and the density of this extracting solvent can be lower than the vehicle fluid phase. This has some advantages since the vehicle fluid phase can be completely covered by the extracting phase, thus virtually eliminating contact with contaminating gases in the atmosphere such as oxygen and other reactive gases, particulate contamination in the form of dust or accidentally added substances, and the temperature and pressure applied to the vehicle fluid phase can fluctuate less since it has an insulating phase on top of it. Some of the advantages include ease of removal of samples from the extracting phase for example by ladling, ease of agitation of the vehicle fluid phase by agitation methods affixed to the bottom of the process vessel, removal of portions of the vehicle fluid phase by valves and removal driven by gravity.

Extracting solvent can be higher in density than the vehicle phase. The invention is not limited to this case however, and there are some advantages to using a vehicle fluid phase which can be lower in density and thus floats on top of the extracting solvent. In this case, gravity and a valve in the bottom of the processing vessels may easily remove portions of the extracting solvent.

Extracting solvent can be the same density as the vehicle phase. There are also advantages to choosing the extracting solvent to be the same density as the vehicle phase. This condition can encourage the formation of many dispersed and small diameter droplets intermixed throughout one of the phases. This can give rise to a very high surface area between the two phases effecting a faster diffusion of the dispersing solvent into the extracting solvent phases.

De-gassing of the extracting solvent. It can often be advantageous to de-gas the extracting solvent both before forming a dispersion and after. This may easily accomplished by sonication, optionally under vacuum, while providing a means for the freed gas to escape. The gases liberated can be reactive such as oxygen, or non-reactive such as nitrogen. If the vessels were sonicated during the process, gases that would normally be dissolved into the fluids would be prevented from doing so. This can give rise to a final product that can be substantially free of any gas at all.

Temperature of the extracting solvent. Low temperatures may typically be used if the extracting power of the solvent can be enough to not require high temperature. Conversely, the solvent extraction can be formed at higher temperatures if that can be advantageous such as improved miscibility properties, enhanced purification, reduced viscosity, or any combination of these as mentioned above.

Pressure of the extracting solvent. Low pressures may easily be used desired. This can be increase the action of de-gassing, change solubilities, or make removal of small aliquots easy.

Ease of reprocessing of the extracting solvent. One of the advantages of using an extracting solvent can be ease of recycling of the components that are trapped by the extracting solvent phase. As portions of this phase are removed during the process, they are composed of mainly the extracting solvent, with smaller amounts of the dispersed particles, the initial dispersing solvent, and the vehicle fluid. This removed mixture can be easily recycled by methods well-known in the art such as centrifugation to remove particle/vehicle resin dispersion, followed by distillation to recover and separate the extracting solvent and dispersing solvent. It can often be the case that a mixture of extracting solvent and dispersing solvent can be useful in a later process rather than pure solvents, thus eliminating the need to separate them.

Various advantages of the invention include, inter alia:

Many types of dispersion quality can be manufactured. Four major types of dispersion quality can be made: bad dispersion-bad distribution, bad dispersion-good distribution, good dispersion-bad distribution, good dispersion-good distribution.

Low temperature processing can be used to minimize solvent evaporation, heat catalyze side reactions, process resins characterized as having low viscosities, (lower temperature increases viscosity), avoids the need for expensive heating apparatus, and improve mixing efficiency.

High temperature processing possible if needed. High viscosity fluids can be used, high viscosity solvents can be used, particles which give rise to large viscosity dispersions can be used, materials that are solid at lower temperatures can be used, high pressure, high temperatures can be used.

High pressures can be used. Gas can be dispersed in liquids, gas can be dispersed in heated solids, process can utilize conventional spinnerette technology to make fibers, process can utilize conventional injection molding technology.

Low pressures can be used. Volatiles easily removed, conventional vacuum devices can be used.

Ease of formation of water-dispersed formulations is possible. Sonication of two phase system gives emulsions with little surfactant needed. Addition of surfactant allows emulsification by high speed mixing, using well-known techniques.

De-gassing, solvents, vehicle fluids, particles, and extracting solvents are all thoroughly de-gassed.

High degree of purification of all components can be accomplished according to various embodiments of the present invention. Substances soluble in extracting solvent can be removed. Substances soluble in dispersing solvent can be removed. Substances soluble in extracting solvent can be removed. Substances soluble in extracting phase can be removed. Volatiles and other gases can be removed. Additional filtration can be used to remove larger particles.

Viscosity of working fluid can be adjusted. Manipulating temperature, shear, amount of extracting solvent in the working fluid, amount of dispersing solvent in the working fluid and pressure can be easily effected, to change the physical properties of the vehicle fluid phase to maximize mixing speed of formation and quality.

Process can be amenable to automation. Conventional computer controlled machinery can be used to automate all parts of the process.

Very high degree of homogeneity of particle mixing. Very high particle degree of homogeneity can be attained.

Easy dispersing of nano-sized components via Brownian Motion. Any particle (regardless of density or dimensions) which can be dispersed in the dispersing solvent and remain relatively stable in solution due to Brownian Motion (nearly any nano-sized particle for example) can be dispersed by the invention.

Mixing of incompatible components possible. Mixing can be accomplished by "reverse cherry picking." Dispersions are forced into a particular distribution, even if the thermodynamics are unfavorable.

New polymer-polymer blends possible. Novel polymer-polymer blends can be made by dispersing dilute solutions of individual polymer molecules into other polymers dispersed in a suitable solvent.

New polymer-plasticizer blends possible. Plasticizers which do not blend with polymers via conventional blending techniques can be added using the processes provided herein.

Dust hazard can be reduced. Handling problems associated with manipulation of electrostatically or non-electrostatically active powders are significantly reduced.

Small batches are possible. The process can be scaled-down if small batches are desired, for example if the particles are extremely expensive (example=carbon nanotube) or rare (example=new pharmaceutical).

Easy scale-up is enabled. Process uses equipment well known by the industry.

Huge number of types of resins can be used. The process can be extremely flexible, nearly any type of resin or oligomer can be used.

Virtually any particle can be used. Nearly any particle many be dispersed, even when the thermodynamics are unfavorable. Virtually any soluble substance can be used.

Any two-phase combinations of solvents can be used. It can be envisioned that a two-phase system with a water containing phase and a second phase which contains resin would be the most widely used combination with the invention, but virtually any two-phase system could be used instead.

Three or more phase combinations may also be used. In some cases, it can be advantageous to use systems that have three or more phases, especially if complicated polymeric systems are part of the process.

Process can be used to purify the vehicle fluid, only. This process can be presented mainly as a means to create a particle/fluid dispersion, but need not be limited to that. Indeed, it can be easily seen that in any case a certain amount of purification takes place no matter what particle can be dispersed or even if no particle can be dispersed. Components which are solubilized by the dispersing solvent can be removed by the extracting solvent.

Process can be used to fractionate the vehicle fluid. If the extracting fluid can be removed continuously, sporadically or periodically in toto, and in coordination with any changes in the type of dispersing solvent, different components can be removed from the vehicle fluid at the same time a particle can be added to the vehicle fluid. This could be very useful if contaminants with the same solubility as the added particle could cause problems of some sort in the final dispersion. This process can as a side-benefit, remove that component. A judicious use of appropriate existing computer controlled processing and analytical equipment can also be used to assemble analytical instrumentation for the identification and isolation of unknown complex mixtures of substances.

Processes can be used to sequentially add different substances to the vehicle fluid. Many different types and concentration of particles and/or dispersing solvent can be added simply by changing the dispersion periodically. This allows this process to make practically any formulation envisioned and for that particle formulation to be created easily by computer automated processing equipment. For example, ladder studies can be performed where a formula can be repeated with only small changes between each individual formula, but the overall experiment can be composed of a wide range of concentrations and components. This labor-intensive, time-consuming, process can be automated by using a bank of dispersions (with all manner of particles dispersed in the appropriate solvent) connected to the process vessel by computer controlled plumbing. After setting up the processing computer program, taking in advantage well-known engineering factorial statistical experimental design algorithms, the technician may then spend most of his time on testing the many resulting formulas.

Processes can be used to add a thermally initiating substance at the very end, then raising vessel temperature to lock in dispersion fine structure. This process makes it quite easy to add a thermally sensitive component at any stage of the process which can catalyze a reaction such as polymerization. For example, at the very end of the procedure, a thermal polymerization initiator can be added, the vessel heated and the vehicle fluid then increased in viscosity by the newly formed polymer. This could make the dispersion less prone to undesirable aggregation or settling. The same thing could also be used in the middle of the process as a form of viscosity control, where the vessel can be kept cool except for when and how long this reaction can be desired, after which the vessel could be rapidly cooled down to the previous temperature.

Photoinitiator can be added at or near the very end of the process, and then polymerizable materials in the dispersion can be irradiated with suitable electromagnetic radiation, such as UV light, to lock in dispersion fine structure. Similar to a thermally activated polymerization initiator, photoactive polymerization can be accomplished by adding a photochemically sensitive polymerization initiator, which can be inactive as long as the vessel can be kept dark or away from ultraviolet light. Thus after this addition, the reaction catalyzed by this photoinitiator can be initiated simply by irradiating the (transparent) vessel with the appropriate light or electromagnetic radiation.

Catalyst can be easily added at any point of the process. In a similar manner to the two examples above, virtually any type of catalyst can be used to catalyze just about any reaction desired at any point in the process or after the process can be complete.

As used herein, the term "fluid" refers to the thermodynamic state of matter exhibited in the liquid state, gaseous state, or the supercritical state. Preferred fluids used in certain embodiments of the present invention are liquids. Suitable liquid fluids can be aqueous or non-aqueous for preparing suitable particle dispersions. A variety of methods for preparing dispersions as provided hereinabove can be used.

Suitable Vehicle Fluids include any of the liquid solvents known for dispersing particles. Combinations of aqueous and liquid fluids can also be used, for example, a miscible mixture of a water-soluble solvent (e.g., alcohol) with water. In certain embodiments, the fluid medium can include a solvent that can be characterized as being compatible, and preferably miscible, with the Vehicle Fluid material. Suitable solvents used in the present invention have a wide range of thermal and physical properties. Suitable solvents have a normal boiling point temperature in the range of from about 20° C. to about 400° C. Preferably, suitable solvents have a normal boiling point temperature in the range of from about 100° C. to about 250° C. Typically, suitable solvents are capable of solubilizing, dispersing, or suspending individual particles or molecules of the substance that can be dispersed. In certain preferred embodiments, the solvent includes dimethyl formamide (DMF), tetrahydrofuran (THF), toluene, acetone, xylene, N-methyl pyrrolidinone (NMP), dichlorobenzene, gamma-butyrolactone, butanol, propanol, dimethyl sulfoxide (DMSO), trichlorobenzene, or any combination thereof. Although liquids that are miscible with the hardenable resin material are generally preferred in many embodiments of the methods of the present invention, certain embodiments can utilize nanotube dispersions containing liquids that are incompatible with the hardenable resin material. As used herein, the term "compatible with the hardenable resin material" refers to the compatibility of polymers (e.g., resins) and solvents with regard to polymer-solution thermodynamics. Compatible solvents include those that swell, soften, or are at least partially miscible with the polymer or resin. Many combinations of polymers and solvents that are compatible (i.e., a solvent for the polymer) and incompatible (i.e., a non-solvent for the polymer) are provided in Polymer Handbook, 3rd Edition, Brandrup and Immergut, Eds., Wiley Interscience, New York, (1989), Chapter VII, "Solution Properties", the entirety of which can be incorporated by reference herein.

In certain embodiments, it can be preferred that the Vehicle Fluid can be capable of suspending individual nano-particles. Suitable fluids for suspending individual nano-particles include dimethylformamide, toluene, tetrahydronaphthalene, decalin, dichlorobenzene, as well as any combination thereof.

Suitable particle dispersions that are used in certain embodiments of the methods of the present invention are typically characterized as being homogeneous or heterogeneous. Suitable homogeneous particle/vehicle dispersions are typically characterized as fluids having substantially no particles visible to the unaided eye. Typical homogeneous dispersions include individual nano-particles, aggregates of fewer than about 10 nano-particles, or both, that are evenly dispersed throughout the fluid. Other embodiments of the present invention make use of homogeneous nanotube dispersions that are substantially free of particle agglomerates.

As used herein, the term "substantially free of particle agglomerates" means that a small amount of particle agglomerates can be present in the dispersion as long as the amount does not affect the properties of the dispersion.

While almost any concentration of particles in the dispersions can be used, suitable dispersions of certain embodiments typically have up to about 10 weight percent of particles, based on total weight of the dispersion. Various embodiments of the present invention use dispersions having particle concentrations much lower than 1.0 weight percent. For example, some dispersions have at least about 0.0001, more suitably at least about 0.001, and even more suitably at least about 0.01 weight percent of particles, based on total weight of the dispersion. In certain embodiments, the concentration of particles can be preferably not more than about 0.1 weight percent of particles, based on total weight of the dispersion. In other embodiments, the concentration of nanotubes can be preferably in the range of from about 0.003 to about 20 weight percent of particles, based on total weight of the dispersion.

Suitable resin materials used in the present invention typically include a resin that can be cured, annealed, glassified, ordered, crystallized, crosslinked, or any combination thereof. Suitable hardenable resin materials include virtually any type of polymeric material, resin-forming precursor, or any combination thereof. Suitable hardenable resin materials are typically capable of comprising a soft condensed matter state throughout which a dispersion of nano-particles can be formed, and subsequently hardened. For example, in one embodiment, liquid epoxy precursors are characterized as being in a soft condensed matter state. Thus, liquid epoxy precursors can be mixed with a particle dispersion, and then the precursors are then cured (i.e., hardened) to form a solid material. In another embodiment, polymers in the liquid or viscoelastic state (i.e., above the glass transition temperature and/or crystalline melt transition temperature) are characterized as soft condensed matter that can be mixed with a particle dispersion, and then hardened by cooling to form a solid material. In other embodiments, polymers that are hard can be made into a soft condensed matter state by application of heat, by dissolution or dispersion in a fluid (e.g., an emulsion or suspension of polymer particles), or both. Such dissolved or dispersed polymers can be mixed with a suitable nanotube dispersion and then hardened by cooling, removal of fluid, or both. Suitable hard polymers include any of the known polymeric materials, such as thermoplastic resins.

Suitable polymeric materials include thermoplastic resins and thermoplastic elastomers. Suitable resin-forming precursors include any type of chemical composition that can undergo a linking reaction (e.g., a chemical reaction) with itself or with other compounds. Examples of resin-forming precursors include monomers (which can undergo a polymerization linking reaction), oligomers, and reactive polymers, such as thermosetting resins, crosslinkable rubber precursors, and radiation curable resins.

Suitable thermosetting resin includes epoxy resins, polyimides, bis-maleimide resins, benzocyclobutenes, phenol resins, unsaturated polyesters, diallyl phthalates, silicone resins, polyurethanes, polyimide silicones, thermosetting polyphenylene ether resins, modified PPE resins, as well as any combination thereof.

Suitable crosslinkable rubber precursors and analogues thereof include precursors of the following: natural rubbers, butadiene rubbers, isoprene rubbers, styrene-butadiene copolymer rubbers, nitrile rubbers, hydrogenated nitrile rubbers, chloroprene rubbers, ethylene-propylene rubbers, chlorinated polyethylenes, chlorosulfonated polyethylenes, butyl rubbers, butyl rubber halides, fluorinated rubbers, urethane rubbers, and silicone rubbers.

Suitable radiation-curable resins include a combination of one or more of polymers, oligomers, and monomers that are ionizing radiation curable, such as acrylates and methacrylates, radical-polymerizable compounds, and materials having as a base an oligomer and/or monomer of a cation-polymerizable compounds and having blended therewith an additive for purpose of curing such as ultraviolet ray polymerization initiator, such as a photo acid generator ("PAG").

While any thermoplastic resin can be used in various embodiments of the present invention, suitable thermoplastic resins typically include at least one of, or any combination of two or more of the following: polyolefins, such as polyethylene, polypropylene, and ethylene cc olefin copolymers such as ethylene-propylene copolymer, polymethylpentene; halogenated polymers such as polyvinyl chloride, polyvinylidene chloride; polyvinyl acetate, ethylene vinyl acetate copolymers, polyvinyl alcohol, polyacetal; fluororesins such as polyvinylidene fluoride and polytetrafluoroethylene; polyesters such as polyethylene terephthalate, polybutylene terephthalate, and polyethylene naphthalate; styrenic polymers such as polystyrenes, polyacrylonitriles, styrene acrylonitrile copolymers, and ABS resins; polyphenylene ether (PPE) and modified PPE resin, aliphatic and aromatic polyamides, such as nylons, polyimides, polyamide imides; polymers and copolymers derived from units consisting of one or more $C_1$-$C_{20}$ n-alkyl acrylate and methacrylate monomers, such as polymethacrylic acid and polymethacrylates such as polymethyl methacrylate, polyacrylic acids; polycarbonates, polyphenylene sulfides, polysulfones, polyether sulfones, polyether nitriles, polyether ketones, polyketones, liquid crystal polymers, silicone resins, ionomers, as well as blends, blocks, grafts, and alloys thereof.

Suitable thermoplastic elastomers include styrene-butadiene or styrene-isoprene block copolymers and hydrogenated polymers thereof, styrene thermoplastic elastomers, olefin thermoplastic elastomers, vinyl chloride thermoplastic elastomers, polyester thermoplastic elastomers, polyurethane thermoplastic elastomers, acrylic thermoplastic elastomers, polyamide thermoplastic elastomers, as well as any combination thereof.

Suitable contacting of nanotube dispersions and hardenable resin materials to form a mixture typically includes bringing the components together in a suitable vessel, such as a container, pipe, conduit, reaction zone, or on a surface or film, or dispersed as particles or molecules in a vacuum or fluid media. The contacting typically allows the nano-particles to diffuse and intermingle with the hardenable resin components. A suitable form of contacting in certain embodiments includes mixing. In certain embodiments the contacting method may include shear mixing. Typically the nano-particles are permitted to become randomly oriented under the influence of Brownian motion in the mixture. Thus, in several embodiments, a certain amount of shear mixing of the components in a suitable container can be permissible, which may orient the nano-particles, and then the shearing can be stopped to allow the nano-particles to become randomly oriented. In certain embodiment, shear mixing can be applied using a shear field to effect efficient intermingling (i.e., mixing) of the component nano-particles, fluid, and hardenable resin material. Suitable containers include reactors, kettles, beakers, drums, tubes and pipes. Suitable shear fields can be applied using a moving surface, a mixing blade, or any other type of impeller known in the art. Use of a shear field is not required in certain embodiments in which the mixture has a low viscosity (e.g., the mixture readily flows as fluid). In preferred embodiments, shear mixing can be minimized and intermingling of the nano-particles and hardenable resin components can be effected primarily by diffusion and sonication.

Suitable sonicating conditions can be provided using any of a number of commercially available sonicating equipment. Suitable sonicators include bath sonicators, probe sonicators, tip sonicators, and cup-horn sonicators. Sonication can be carried out at a suitable frequency and acoustic power to maintain the nano-particles dispersed in the mixture. The sonicating frequency can be in the range of from about 1 KHz to about 10,000 KHz, more typically in the range of from about 20 KHz to about 6,000 KHz, and even more typically in the range of from about 20 KHz to about 200 KHz. Suitable sonicating power varies with the volume of the mixture that can be being sonicated. Sonicating power can also be varied and can be expressed in terms of acoustic power, which can be measured in units of unit power per unit area (e.g., $W/cm^2$). As an example, a one pint mixture can be sonicated using a power in the range of from about 10 to 200 watts. Different mixture volumes typically require differing sonication power that scales with mixture volume. A suitable acoustic power can be in the range of from about 0.01 $W/cm^2$ to 1000 $W/cm^2$, more typically in the range of from about 0.01 $W/cm^2$ to 50 $W/cm^2$, and even more typically in the range of from about 0.01 $W/cm^2$ to 2 $W/cm^2$.

In certain embodiments of the present invention there are provided methods that further include removing at least a portion of the fluid medium from the mixture while sonicating. Removing at least a portion of the fluid medium while sonicating can be carried out under conditions of allowing the fluid medium to evaporate. Sonicating typically adds energy to the mixture, which in open systems, may contribute to the evaporation of at least a portion of the fluid medium. Evaporation of the fluid medium may also be effected by heating the mixture, by subjecting the mixture to a lower pressure (e.g., under a vacuum), or any combination thereof. Evaporation of the fluid medium can be conducted before sonicating has begun, during sonicating, after sonicating has ceased, or any combination thereof. In certain preferred embodiments it can be desirable that substantially all of the fluid medium can be removed. By "substantially all of the fluid medium can be removed" means that a small amount of fluid medium that may reside within the mixture does not affect the properties of the resulting composite material.

The components can be mixed in a variety of ways. In one embodiment the contacting includes flowing the dispersion into the hardenable resin material, the hardenable resin material residing within a container while sonicating the contents of the container to form a mixture. Suitable containers are capable of containing the mixture. Suitable containers can be placed in a sonicating bath, a sonicator can be placed in a suitable container, or both. Suitable containers typically include flasks, vials, tubes, drums, reaction vessels, as well as combinations thereof.

In another embodiment there can be a method of preparing a nanotube composite material in which the hardenable resin material can be a curable resin. In this embodiment, the method may further include contacting the fluid medium, dispersion, hardenable resin material, mixture, or any combination thereof, with a curing agent. Suitable curing agents are readily vailable in the polymeric materials art. Many suitable curing agents are commercially available in liquid form. Suitable examples of curing agents include those activated by visible light, ultraviolet light, heat, radiation, or any combination thereof. The timing of the addition of the curing agent influences the kinetics of the curing of the curable resin and the resulting morphology of the nanotube composite. Thus, in certain embodiments, it can be desirable that the contacting with the curing agent occurs at least prior to sonicating the mixture. In other embodiments the contacting with the curing agent occurs after sonicating has begun. Likewise, the timing of the removal of at least a portion of the fluid can influence the kinetics of the curing of the curable resin. The timing of the removal of at least a portion of the fluid can also influence the resulting morphology of the nanotube composite. Thus, in certain embodiments that include the addition of a curing agent, at least a portion of the fluid medium can be removed from the mixture while sonicating. Preferably, substantially all of the fluid medium can be removed so that traces of the residual fluid have essentially no effect on the resulting properties of the nanotube composites. The fluid medium can be removed by evaporation. In certain embodiments that include the contacting of the mixture with a curing agent, this contacting occurs after substantially all of the fluid medium can be removed.

In several embodiments, hardening the resin material typically includes curing, glassification, ordering, crystallization, or any combination thereof. Curing typically occurs in thermosetting resin systems, for example in reactive epoxy, vinyl ester, and polyurethane reactive composite precursors. Glassification typically occurs in materials that are cooled below their glass transition temperature. Examples of hardenable resin materials that are capable of glassification include acrylic and styrenic polymers. Ordering typically occurs in amphiphilic systems, such as block copolymers, wherein the differing polymer blocks attempt to segregate from each other from a softer disordered state to form ordered structures that typically have increased stiffness. Crystallization typically occurs in polymers having a portion that can be characterized as isotactic or syndiotactic. Crystallizable polymers typically harden upon cooling below their crystalline melt transition temperature. In various of these embodiments, solvent may optionally be present as the resin hardens.

In certain preferred embodiments, this hardening of the resin material typically begins after the sonicating has begun, although the resin can begin to harden before sonicating. For example, in certain embodiments, it can be desirable to allow the resin to harden less than required to form a solid. Hardening before sonicating may also be desirable in certain embodiments for controlling viscosity. Hardening before sonicating may also be desirable in certain embodiments for controlling morphology, for example, to provide resinous microdomains, nanodomains, or both in the composites. The point at which the sonicating can be halted can vary depending on the desired morphology of the dispersed nano-particles in the resulting matrix. In certain embodiments where the hardenable resin forms a physically tough substance, such as in an engineering composite resin, the hardening typically continues well after the sonicating has stopped. In other embodiments, the hardening typically continues even after the sonicating stops. Other embodiments permit the sonicating to stop while the nano-particles are still somewhat mobile to control agglomeration, aggregation, or both, of the dispersed nano-particles in the matrix.

In one embodiment of the present invention there are provided methods that include providing a dispersion having nano-particles and a fluid medium, mixing the dispersion with a thermally-curable or radiation-curable resin to form a mixture, sonicating the mixture, and hardening the resin material. Suitable thermally-curable resins include an epoxy resin, a polyester resin, an acrylic resin, a polyimide resin, or any combination thereof. In certain embodiments, the curable resin can be at least partially uncured during mixing with the dispersion, and in preferred embodiments the curable resin remains substantially uncured during mixing with the dispersion.

Various embodiments of the present invention also provide for compositions comprising at least nanotubes and a matrix material. Such materials can be made according to the general procedures provided herein. In one embodiment, for example, there are provided compositions that include a matrix material and SWNTs, wherein the compositions have an electrical conductivity greater than about $10^{-9}$ S/cm. In these embodiments, the SWNTs typically have a weight fraction, relative to the matrix material, in the range of from about 0.0001 to less than 0.005. More typically, the SWNTs have a weight fraction of at least about 0.0002, even more typically at least about 0.0005 weight percent, further typically at least about 0.001 weight percent, and even further typically at least about 0.002 weight percent.

Increasing conductivity at low nanotube weight fraction can be obtained using single SWNTs. Thus, in certain embodiments, the SWNTs typically comprise greater than about 50 percent by weight of single SWNTs. The characteristics of the dispersion of the nanotubes in the matrix material also affects electrical conductivity. One dispersion characteristic can be homogeneity, thus certain embodiments of the present invention provide for matrix materials having homogeneously dispersed SWNTs, whereas other embodiments allow for slight heterogeneity of the SWNTs to control the properties of the composition. Thus, several embodiments of the present invention include SWNTs that are inhomogeneously dispersed in the matrix material as well.

EXAMPLES AND OTHER ILLUSTRATIVE EMBODIMENTS

Procedures and processes to manufacture blends of liquids and carbon nanotubes. Equipment (see, e.g., FIG. 1). Glass tube—Reaction kettle bottom for large scale, 4'×1'; smaller glass tube for laboratory scale processes. Top—Rubber septa for laboratory scale reaction kettle top, 4 hole reaction kettle top for large scale process. Tube for DMF Solution Addition—Hypodermic needle for lab scale process, stainless steel or glass tube for plant scale process. Pump for DMF Solution in addition to syringe for lab scale process, fluid peristaltic pump for larger scale process (or other agitation method such as vibration shaker). Heated or cooed Ultrasound bath—35 degrees C., 55 KHz other temperatures depending on the nature of the bulk resin liquid used.

Optional Equipment. Agitation—magnetic stiffing set-up for laboratory scale, mechanical stirring apparatus for larger scale process. Inert gas purging/blanketing apparatus can be provided.

Description of the Process. A glass tube is charged with epoxy resin at 85 degrees C. to form a reasonably small layer in the bottom of the glass tube. Water is added on top of the liquid epoxy layer gently so as to minimize mixing of epoxy and water. After water addition is complete, sonication is applied at 55 Khz±5 KHz so as to treat the entire epoxy layer and significant portion of the water phase. When the water phase becomes cloudy with the emulsified epoxy and water dispersible contaminants from the phase, a tube is lowered such that the end is close to the bottom and centered. DMF/Carbon nanotube solution with nanotubes individually dispersed is then added drop-wise and gently so as to maximize the mixing with epoxy and minimize the rising of the droplet due to its lower density. If the droplet is mixed properly, the top level of the water phase will rise the same amount. The phase will then lower as the total or water top level will stay the same. Comparing the changing phase gives an indication of the rate of DMF extraction from the phase to the water phase. On the other hand, the level of the water phase (an indication of the total volume) gives a nearly exact measure of the added DMF, assuming the carbon nanotubes have negligible volume. Thus, at anytime during the process, the composition of the water phase can be calculated using published tables of the partitioning coefficients pertinent to the composition of each layer. These compositions can control the flexibility and reproducibility of this process allowing a wide variation in the densities of the two phases which can be used essentially unchanged in this process. When the water phase is mostly water, the density is about 1 g/cc. Upon addition of a DMF nanotube solution droplet (much lower density), the buoyant forces cause the droplet to rise out of the phase, through the water phase, and the drop will finally reach the water phase surface where it will "flatten" out, the nanotubes will precipitate, then sink down until they are back in the phase. This can eventually give rise to large, water contaminated nanotube precipitates in the phase. Alternatively, if this is the case, one could add DMF to the water phase, lowering its density and consequently lowering the buoyancy pressure on the added DMF solution droplet, ideally giving it sufficient time to mix with epoxy solution so that the delivered nanotubes never enter the water phase. Another effect that the amount of DMF in the water phase is on the rates of diffusion of the DMF into the water phase. As the DMF concentration in the water phase increases, the rate of diffusion decreases, thus the concentration of DMF in the phase will decrease more slowly and will reach equilibrium levels that are higher in the layer. This has contradictory effects on the rates of nanotube precipitation in the layer. DMF is a better solvent for nanotubes than epoxy (or almost any other liquid). Thus higher DMF levels will solvate the nanotubes better. However, DMF is a good "cutting" solvent for epoxy (and many other oligomeric fluids), so a higher DMF content will lower the bulk viscosity of the phase. Lower viscosity will increase precipitation rate not only because of diffusive translational reasons, but also because mixing fluids of lower viscosity results in much less mixing shear forces. It is well known that dispersing incompatible substances into commonly used resins using moderate shear mixing is much more facile than mixing under low shear conditions. The shear "action" tends to break up loose aggregates of the incompatible component. There is one more phenomena on which is dependent upon DMF levels in the water phase—heat of mixing. The enthalpy of mix between DMF and water is quite high as to be expected between water and high dipolar moment, hydrogen bonding molecules. Low DMF concentrations in the water phase can give rise to large temperature increases due to this high heat of mixing. Since the process works best (in this example) at 85 degrees C., heat of the mix could easily cause the temperature to rise well above 85 degrees C. Alternatively in a plant process, this phenomenon could be used to advantage, i.e. lower heating costs.

Completing the Process. The DMF/nanotube solution is added until the desired nanotube epoxy concentration is reached (corrected for loss of epoxy and nanotube into the removed water phase). The water phase needs to be completely removed as a last step. Removal at 85 degrees C. can give rise to significant amounts left in the phase. This can be prevented by cooling the entire mix down until the phase is much higher in viscosity than the water phase, (typically around 0 degrees C.). Then, the vessel can be tipped over and the water phase easily decanted off. Then, for a final drying to remove residual volatiles, the remaining phase can be reheated under sonication to 85 degrees C. with purging by inert gas or air depending on the desired effect until the resin mixture is dried.

Modifications of the Process to Make Different Products. An example of particles (or a component) to be added to the layer includes carbon nanotubes. Any type of nanotube could be used—single walled, double walled, multilayer, but the process works equally with other compounds as well, compatible or incompatible. The component is immiscible in water and be dispersible or soluble in a water-soluble solvent such DMF. A second component is added which can augment the property of the nanotube, such as a pyrrolyzed polyacrylonitrile graphite fiber, to obtain even higher electrical conductivity. Alternatively, a second component could be added which had a completely different function. This process is also useful to mix in substances such as silica, hollow glass spheres, zeolites, silicones or germanium crystals, "brick dust"-highly cross-linked and precipitated polymers, liquid crystalline fibers such as Kevlar, polybenzimidazoles, polymides, and the like. Even other liquids soluble in DMF, which would normally be incompatible with the phase can be used in the process, as long as the density is different than the water phase. Any "filler" material, that is insoluble in water, could also be successfully added to resins by this method. Some examples are wood pulp, cellulose, cotton sinters, chitin with or without calcium shell remnants, chitosan, collagen, fibrin, globular proteins, enzyme complexes, catalysts of all sorts, keratin fat globules, DNA complexes, RNA, and other cellular components. Constituents such as mitochondria, Golgi bodies, nuclei, reticular plasmic membranes, or even stem cells. The only requirement of the added material is dispersible or solubility in a water soluble solvent and low miscibility of the material in pure water.

Dispersing Solvent. DMF is the example solvent but any water miscible solvent such as NMP, gamma-butyrolactone, DMSO, THF, methanol, ethanol, propanol, amines of epoxy adducts, phosphides, ketones such as acetone, aldehydes such as MIBK, acids such as lactic acid, propionic acid, acetic acid, HCl, H2SO4, HF, benzylic acid, and the like.

Nature of Dispersed Media. Several examples use an epoxy resin—a low molecular weight bisphenol-A diepoxy. However, any resin or moderate molecular weight liquid (oligomer) can be used. The liquid is typically insoluble with water and has a low tendency to emulsify in water under sonication so as to form a visible two phase system. In the main example given at the beginning, the epoxy is denser than water, but compounds less dense than water can also be used. Even liquids immiscible in water with a similar density can be used, although more than two phases will be formed. Examples include waxes, hydrocarbons, iso-octane, petroleum, ether, mineral sprits or molten in salts, and high molecular weight substances such as engineering plastics and composites. It is preferred that monomeric or oligomeric precursor be used, then polymerized or cross-linked with nanotubes present in a similar manner as used in existing commercial procedures so that a minimal amount of processing change is needed to add the extra ingredient. Examples are monomers such as butyl-methyl acrylate, acrylonitrile, styrene vinyl acetate, vinyl chloride for addition chain polymerization products, diacids, diamines, blocked isocyanates, blocked acids might be good candidates for eventual incorporation in condensation type stepwise or chain growth polymers. Other viscous fluids could be used as "universal" carrier components with no further reaction intended after incorporation into the final commercial product or its starting materials. Examples would be BYK 190, polyhydrocarbons, polyketones, virtually any oligomer which is liquid at temperatures below 100 degrees C. and are immiscible in water.

Sonication and heating. The example uses a sonicator with a base frequency of 55 KHz±5 KHz and a temperature of 85 degrees C.±5 degrees C. This temperature and sonication frequency was chosen so as to give isolated solublized carbon nanotubes in DMF, thus giving the best chance that they can be dispersed eventually in the epoxy also as isolated (non-touching) individual nanotubes. However, changing these conditions should allow the system to be tailored so as to produce nanotube precipitates which can be varied in a precise manner to produce all types of overage, such as agglomeration types, morphology, flocculation amounts, perhaps even fibril formation which would be very useful for electronic applications. One could also vary the first three components of the process as used to enhance a particular desired result. For example adding DMF to the water phase would decrease the diffusion rate of the phase DMF into the water phase. Since the good solvating DMF is in the phase longer, it should slow down the precipitation and other associated processes which control grow precipitate proprieties. This for some applications cooling might be used at temperatures above 0 degrees C. One example mentioned previously is cooling the system to increase the viscosity of the phases solvent, removal or the phase is accomplished more easily and completely. Sonication can be at different frequencies at different of the process to either encourage or discourage the precipitation process. The frequency could even be swept, pulsed or consist of other more complete wave form/time juxtapositions.

Types of Agitation. In the lab epoxy-nanotube example no discrete mixing or agitation methods were used. However, in large scales or with different goals is in mind, the process can benefit from outside or internal agitation methods. In the lab, magnetic stir-bar/magnetic stir-bar stirrer/heater can be used. Whole system agitators may also be used, such as shakers, vibrators, oscillatory platforms, mechanical stirrers can be used with a metallic or glass stir-rod plus propeller attached to a mechanical stirring motor. The stir blade could then be optimized to fit the desires result. For example, if isolated, non-touching nanotubes are desired, a "Cowles" type mixing blade can be indicated. If the goal is speed of DMF extraction or blade that can be rotated at very high speeds with sufficient up and down fluid movement so as to form a vortex.

Heating and Illumination by Electro Magnetic Radiation. Heating is an important part of the process (as well as cooling as mentioned previously). Heating will tend to speed up the precipitation, cooling will slow it down. Heating can be accomplished by the use of a heat exchange apparatus. Alternatively, electromagnetic radiation can be used. Carbon nanotubes are black because they absorb all frequencies of visible light; however, they also absorb above and below the visible region, namely the infrared and ultraviolet regions. UV irradiation is especially interesting since it could be used to activate UV absorbing photoinitiators that form radicals which then start radical polymerization or other radical chemical processes. Since radical addition polymerization processes are known to be extremely fast and give rise to a mixture of very high molecular weight and monomer with very little intermediate molecule weight. Present, this system would be ideal for a process whereby simultaneously with the polymerization, shear pressure is introduced by the use of spinnerettes as used routinely to form polyester or polyamide fibers by the textile industry. Thus, a high molecular weight polyacrylonitrile filament could be made which contains carbon nanotubes precipitates, which are also aligned along the fibril axis and easily purified of residual monomer by washing in a coagulant bath. This PAN fiber then could easily and continuously be converted to graphite by passing the fiber though a high temperature furnace under inter atmospheric common method to form graphite thread used in fiber-reinforced high tech composites. This graphite thread would have oriented fibrils of carbon nanotubes in it resulting in a reinforcing fiber with greatly increased mechanical strength and other augmented properties.

Nanoheating and Selective Absorbtion. This process could be used to disperse carbon nanotubes into fluids which are transparent to visible light but contain monomers and/or oligomers which can polymerize or cross link by cationic or radical addition polymerization. A UV lamp would be used to generate the initiating species which could be radicals, cations, or possibly anions. A visible light lamp would only be absorbed by the isolated by the well-dispersed nanotubes which would than re-irradiate heat in the micro-region of the nanotube. Thus you would have a "nanoheater" heating a micro region. You could use pulsed sources of both types of light. Of course, this nanoheater/microregion effect could be used simply to improve the nanotube DMF or nanotube epoxy dispersion since the heat generated would be localized around the available kinetic energy to this area only while regions with low concentrations of nanotubes would be significantly cooler.

Alteration of Reaction Kinetics and Manipulation of Thermal Properties such as Bulk Thermal Conduction or Glass Transition Temperature Phenomenon Enhanced Encapsulation of Carbon Nanotubes. Illumination of well isolated dilute solution nanotubes by visible light in a transparent media can have a number of interesting physical effects which can be utilized to advantage. The first phenomenon would be the same as that which would be of service for graphite or carbon black. Light absorbed would be temporally stored as chemical potential energy in the form of excited electronic or molecular bonding energies isolated mostly among PI orbital complexes. With nanotubes this would consist of (ideally) two cylinders (single wall nanotube only)—one outside the nanotube and one inside with a diameter smaller than the nanotube itself. This excited state energy is transformed upon electronic relaxation presses to other forms of potential energy or is converted to kinetic energy (measured by temperature increases) or reradiated by electromagnetic wave emission (IR or visible light). Thus, this process will cause the micro region both inside and outside the nanotube to increase in temperature. Combining a UV oligomer, UV photon initiator or UV light to the region around the nanotube can give rise to an increase in reaction rate only on the outside since even though the inside has been micro heated, the nanotube walls block the UV from catalyzing the reaction. This can give rise to an encapsulation of the nanotube without any reaction on the inside—giving you a nanotube with an unaltered interior but with a cylindrical coating of UV catalyzed polymer on the outside only. So you have a bigger diameter nanotube which retains the high aspect ration of the original material, if this material is transparent to visible light you now have a nanoheater with a built-in heat sink. With nanotubes (single walled only), there is another mode of thermal conduction—"ballistic conduction." This is the conduction of heat through the nanotube from one end to the other with little or no interaction with the nanotube interior walls. Now, taking this thermal conduction path and combining it with the thermal energy built up on the surface of nanotube by light, UV, or IR absorption, it is reasonable to predict that at least some of the thermal energy will be converted to phonons and thus can do it ballistically and conduct out of one nanotube end or the other or perhaps both ends simultaneously. Since nanotubes typically have very high aspect ratios, this can give rise to an even more localized (a very tiny scale) heating effect, "pico-heating" only at the very small areas at the nanotube ends.

The examples show some of the methods utilized in this invention to make particle dispersions in resins resulting in dispersions with characteristics ranging from homogeneously distributed SWNT ropes at one extreme, or to dense aggregates as the opposite extreme, and all possibilities in-between. Several types of highly purified and well characterized nanotubes with different mean lengths, diameters, and morphologies were used. The examples discussed below used vapor deposition single wall carbon nanotubes (SWNT) Thomas Swan (lots K1731, K2127) and HiPC® SWNT tubes (Carbon Nanotechnologies, Inc. (CNI), lot X5016). Multi-walled carbon nanotubes (MWNT) were used as received from Nanocyl (lots MWA-PL30041013, MWA-P-PL30041016). Carbon nanofibers were used as received from Electrovac Nanofibers (lot HTF150FF-LHT). Various forms of Cab-O-Sil were used as received from Cabot Corporation.

Common resins were used such as Shell Epon 828 (diglycidyl epoxy of Bisphenol-A, Miller Stephenson) epoxy resin and cured with amines such as Epicure 3234 cross-linker (aliphatic amine, Miller Stephenson). Various forms of Cab-O-Sil were used as received from Cabot Corporation.

The first examples illustrate different dispersion techniques to obtain particle/solvent dispersions, which were used later to form particle/resin dispersions. The later examples describe procedures to convert the particle/solvent dispersions into particle/resin dispersions and the curing of these particle/resin dispersions by commonly used cross-linking techniques to obtain solid composite parts with excellent mechanical properties suitable for subsequent analytical testing typically used in the composite material analysis community.

EXAMPLE ONE

To a 30 ml scintillation vial, 2.17 g of MWNT Nanotubes (Nanocyl (lot MWA-PL30041013) were added to 51.15 g of DMF to obtain a slurry with a concentration of 4.07 wt %. The slurry was mixed by use of a rotary type mixer for one week resulting in a solid paste. Lab book reference number DK6-3A.

EXAMPLE TWO

To a 30 ml scintillation vial, 2.06 g of MWNT Nanotubes (Nanocyl (lot MWA-P-PL30041016) were added to 63.44 g of DMF to obtain a slurry with a concentration of 3.14 wt %. The slurry was mixed by use of a rotary type mixer for one week resulting in a solid paste. Lab book reference number DK6-3B.

EXAMPLE THREE

To a 30 ml scintillation vial, 4.19 g of carbon nanofibers from Electrovac Nanofibers (lot HTF150FF-LHT) were added to 54.48 g of DMF to obtain a slurry with a concentration of 7.14 wt %. The slurry was mixed by use of a rotary type mixer for one week resulting in a loose slurry. The vial was then sonicated in a Branson sonicator at 40 KHz for 48 h resulting in a runny paste. Lab book reference number DK6-3C.

EXAMPLE FOUR

To a 4 oz bottle, 0.2476 g Cab-O-Sil M-5, Cabot Corporation were added to 6.87 g of DMF to obtain a slurry with a concentration of 3.6 wt %. The slurry was mixed by gentle hand shaking then allowed to stand undisturbed for 24 h resulting in a hazy homogeneous slurry. Lab book reference number DK6-5H.

EXAMPLE FIVE

To a 16 oz bottle, 0.0145 g SWNT CNI lot X5016, were added to 318 g of DMF to obtain a slurry with a concentration of 0.00455 wt %. The slurry was mixed by gentle hand shaking then sonicated in a Branson sonicator at 55 KHz for 48 h resulting in a dark black, transparent solution. Lab book reference number DK6-8A.

EXAMPLE FIVE

To a 16 oz bottle, 0.0182 g SWNT CNI lot X5016, were added to 363 g of DMF to obtain a slurry with a concentration of 0.00501 wt %. The slurry was mixed by gentle hand shaking then sonicated in a Branson sonicator at 55 KHz for 48 h resulting in a dark black, transparent solution. Lab book reference number DK6-8B.

EXAMPLE SIX

To a 16 oz bottle, 0.0177 g SWNT CNI lot X5016, were added to 393 g of DMF to obtain a slurry with a concentration of 0.00450 wt %. The slurry was mixed by gentle hand shaking then sonicated in a Branson sonicator at 55 KHz for 48 h resulting in a dark black, transparent solution. Lab book reference number DK6-8C.

EXAMPLE SEVEN

To a 16 oz bottle, 0.0161 g SWNT CNI lot X5016, were added to 367 g of DMF to obtain a slurry with a concentration of 0.00438 wt %. The slurry was mixed by gentle hand shaking then sonicated in a Branson sonicator at 55 KHz for 48 h resulting in a dark black, transparent solution. Lab book reference number DK6-8D.

EXAMPLE EIGHT

To a 16 oz bottle, 0.0161 g SWNT CNI lot X5016, were added to 367 g of DMF to obtain a slurry with a concentration of 0.00438 wt %. The slurry was mixed by gentle hand shaking then sonicated in a Branson sonicator at 55 KHz for 48 h resulting in a dark black, transparent solution. Lab book reference number DK6-8E.

EXAMPLE NINE

To a 16 oz bottle, 0.0311 g SWNT CNI lot X5016, were added to 313 g of DMF to obtain a slurry with a concentration of 0.00992 wt %. The slurry was mixed by gentle hand shaking then sonicated in a Branson sonicator at 55 KHz for 48 h resulting in a dark black, transparent solution. Lab book reference number DK6-8F.

EXAMPLE TEN

To a 16 oz bottle, 0.0665 g SWNT Thomas Swan lot K1713, were added to 414 g of DMF to obtain a slurry with a concentration of 0.0161 wt %. The slurry was mixed by gentle hand shaking then sonicated in a Zenith sonicator at 50 KHz for one week resulting in a dark black, transparent solution. Lab book reference number DK6-10C.

EXAMPLE ELEVEN

To a 16 oz bottle, 0.0627 g SWNT Thomas Swan lot K1713, were added to 414 g of DMF to obtain a slurry with a concentration of 0.0154 wt %. The slurry was mixed by gentle hand shaking then sonicated in a Zenith sonicator at 50 KHz for one week resulting in a dark black, transparent solution. Lab book reference number DK6-10D.

EXAMPLE TWELVE

To a 16 oz bottle, 0.0602 g SWNT Thomas Swan lot K1713, were added to 438 g of DMF to obtain a slurry with a concentration of 0.0137 wt %. The slurry was mixed by gentle hand shaking then sonicated in a Zenith sonicator at 50 KHz for one week resulting in a dark black, transparent solution. Lab book reference number DK6-10E.

EXAMPLE THIRTEEN

To a 16 oz bottle, 0.0613 g SWNT Thomas Swan lot K1713, were added to 421 g of DMF to obtain a slurry with a concentration of 0.0146 wt %. The slurry was mixed by gentle hand shaking then sonicated in a Zenith sonicator at 50 KHz for one week resulting in a dark black, transparent solution. Lab book reference number DK6-10F.

EXAMPLE FOURTEEN

To a 16 oz bottle, 0.0616 g SWNT Thomas Swan lot K1713, were added to 418 g of DMF to obtain a slurry with a concentration of 0.0142 wt %. The slurry was mixed by gentle hand shaking then sonicated in a Zenith sonicator at 50 KHz for one week resulting in a dark black, transparent solution. Lab book reference number DK6-10G.

EXAMPLE FIFTEEN

To a 16 oz bottle, 0.0611 g SWNT Thomas Swan lot K1713, were added to 448 g of DMF to obtain a slurry with a concentration of 0.0136 wt %. The slurry was mixed by gentle hand shaking then sonicated in a Zenith sonicator at 50 KHz for one week resulting in a dark black, transparent solution. Lab book reference number DK6-10J.

EXAMPLE FIFTEEN

To a 16 oz bottle, 0.0620 g SWNT Thomas Swan lot K1713, were added to 434 g of DMF to obtain a slurry with a concentration of 0.0143 wt %. The slurry was mixed by gentle hand shaking then sonicated in a Zenith sonicator at 50 KHz for one week resulting in a dark black, transparent solution. Lab book reference number DK6-10K.

EXAMPLE SIXTEEN

To a 16 oz bottle, 0.0668 g SWNT Thomas Swan lot K2127, were added to 360 g of DMF to obtain a slurry with a concentration of 0.0186 wt %. The slurry was mixed by gentle hand shaking then sonicated in a Zenith sonicator at 50 KHz for one week resulting in a dark black, transparent solution. Lab book reference number DK6-15A.

EXAMPLE SIXTEEN

To a 16 oz bottle, 0.0625 g SWNT Thomas Swan lot K2127, were added to 350 g of DMF to obtain a slurry with a concentration of 0.0179 wt %. The slurry was mixed by gentle hand shaking then sonicated in a Zenith sonicator at 50 KHz for one week resulting in a dark black, transparent solution. Lab book reference number DK6-15B.

EXAMPLE SIXTEEN

To a 16 oz bottle, 0.0625 g SWNT Thomas Swan lot K2127, were added to 350 g of DMF to obtain a slurry with a concentration of 0.0179 wt %. The slurry was mixed by gentle hand shaking then sonicated in a Zenith sonicator at 50 KHz for one week resulting in a dark black, transparent solution. Lab book reference number DK6-15C.

EXAMPLE SEVENTEEN

To a 16 oz bottle, 0.0643 g SWNT Thomas Swan lot K2127, were added to 343 g of DMF to obtain a slurry with a concentration of 0.0187 wt %. The slurry was mixed by gentle hand shaking then sonicated in a Zenith sonicator at 50 KHz for one week resulting in a dark black, transparent solution. Lab book reference number DK6-15D.

EXAMPLE EIGHTEEN

To a 16 oz bottle, 0.0629 g SWNT Thomas Swan lot K2127, were added to 346 g of DMF to obtain a slurry with a concentration of 0.0182 wt %. The slurry was mixed by gentle hand shaking then sonicated in a Zenith sonicator at 50 KHz for one week resulting in a dark black, transparent solution. Lab book reference number DK6-15E.

EXAMPLE NINETEEN

To a 16 oz bottle, 0.0688 g SWNT Thomas Swan lot K2127, were added to 374 g of DMF to obtain a slurry with a concentration of 0.0184 wt %. The slurry was mixed by gentle hand shaking then sonicated in a Zenith sonicator at 50 KHz for one week resulting in a dark black, transparent solution. Lab book reference number DK6-15F.

EXAMPLE TWENTY

To a 16 oz bottle, 0.0680 g SWNT Thomas Swan lot K2127, were added to 358 g of DMF to obtain a slurry with a concentration of 0.0190 wt %. The slurry was mixed by gentle hand shaking then sonicated in a Zenith sonicator at 50 KHz for one week resulting in a dark black, transparent solution. Lab book reference number DK6-15G.

EXAMPLE TWENTY ONE

To a 16 oz bottle, 0.0600 g SWNT Thomas Swan lot K2127, were added to 366 g of DMF to obtain a slurry with a concentration of 0.0164 wt %. The slurry was mixed by gentle hand shaking then sonicated in a Zenith sonicator at 50 KHz for one week resulting in a dark black, transparent solution. Lab book reference number DK6-16B.

EXAMPLE TWENTY TWO

To a 16 oz bottle, 0.0632 g SWNT Thomas Swan lot K2127, were added to 340 g of DMF to obtain a slurry with a concentration of 0.0186 wt %. The slurry was mixed by gentle hand shaking then sonicated in a Zenith sonicator at 50 KHz for one week resulting in a dark black, transparent solution. Lab book reference number DK6-16C.

EXAMPLE TWENTY THREE

To a 16 oz bottle, 0.0635 g SWNT Thomas Swan lot K2127, were added to 346 g of DMF to obtain a slurry with a concentration of 0.0184 wt %. The slurry was mixed by gentle hand shaking then sonicated in a Zenith sonicator at 50 KHz for one week resulting in a dark black, transparent solution. Lab book reference number DK6-16E.

EXAMPLE TWENTY FOUR

To a 16 oz bottle, 0.0681 g SWNT Thomas Swan lot K2127, were added to 354 g of DMF to obtain a slurry with a concentration of 0.0192 wt %. The slurry was mixed by gentle hand shaking then sonicated in a Zenith sonicator at 50 KHz for one week resulting in a dark black, transparent solution. Lab book reference number DK6-16G.

EXAMPLE TWENTY FIVE

To a 16 oz bottle, 0.0682 g SWNT Thomas Swan lot K2127, were added to 322 g of DMF to obtain a slurry with a concentration of 0.0218 wt %. The slurry was mixed by gentle hand shaking then sonicated in a Zenith sonicator at 50 KHz for one week resulting in a dark black, transparent solution. Lab book reference number DK6-16H.

EXAMPLE TWENTY SIX

To a 16 oz bottle, 0.0703 g SWNT Thomas Swan lot K2127, were added to 360 g of DMF to obtain a slurry with a concentration of 0.0195 wt %. The slurry was mixed by gentle hand shaking then sonicated in a Zenith sonicator at 50 KHz for one week resulting in a dark black, transparent solution. Lab book reference number DK6-16K.

EXAMPLE TWENTY SIX

To a 16 oz bottle, 0.0720 g SWNT Thomas Swan lot K2127, were added to 346 g of DMF to obtain a slurry with a concentration of 0.0208 wt %. The slurry was mixed by gentle hand shaking then sonicated in a Zenith sonicator at 50 KHz for one week resulting in a dark black, transparent solution. Lab book reference number DK6-16M.

EXAMPLE TWENTY SEVEN

To a 16 oz bottle, 175.75 g of de-ionized, triple filtered water was added to 49.81 g Epon 828 epoxy resin to obtain a two phase system with a water layer on top and a resin layer below. The slurry was sonicated in a Zenith sonicator at 50 KHz for one hour at room temperature to degas the system. Previously prepared dispersions of Thomas Swan SWNT/DMF solutions (as described above) were added to the epoxy layer directly by the use of a 10 ml hypodermic needle/syringe apparatus until the calculated concentration of SWNT/epoxy was approximately 0.2 wt %. As the SWNT/DMF solution was added, aliquots of the water layer were periodically removed by pipette and replaced by fresh water to keep the overall liquid level the same and to keep the DMF concentration in the water layer relatively constant. The temperature of the system was keep at slightly above room temperature. After addition of SWNTs was complete, the biphasic system was cooled 24 h in a freezer resulting in a solid resin phase and a liquid water phase. The water phase was removed by decanting the liquid, taking care that the resin layer not be heated enough for it to become liquid. This procedure was then repeated until all of the water layer was removed. The relatively dry resin layer was then sonicated in a Zenith sonicator at 50 KHz for several hours to remove all volatile components and contaminants resulting in a dark black, opaque high viscosity solution. Conductivity of the uncured liquid was measured to be approximately 5E-4 S/cm. Lab book reference number DK6-51A.

EXAMPLE TWENTY EIGHT

To a 30 ml scintillation vial 2.5 g of Epon 828 was added to 0.5 g of the dispersion described in Example Twenty Seven (DK6-51A). The mixture was mixed by use of a spatula while sonicating at room temperature in a Branson sonicator at 55 KHz, resulting in a concentration of 0.03 wt %. When the mixture was homogeneous, 0.48 g Epicure 3234 was added, mixed while sonicated, poured into a dog-bone Teflon mold and the sample cured for one hour at 85° C., resulting in a gray semi-transparent hard brittle solid. Lab book reference number DK6-59B.

EXAMPLE TWENTY NINE

To a 30 ml scintillation vial 2.0 g of Epon 828 was added to 1.0 g of the dispersion described in Example Twenty Seven (DK6-51A). The mixture was mixed by use of a spatula while sonicating at room temperature in a Branson sonicator at 55 KHz, resulting in a concentration of 0.055 wt %. When the mixture was homogeneous, 0.62 g Epicure 3234 was added, mixed while sonicated, poured into a dog-bone Teflon mold and the sample cured for one hour at 85° C., resulting in a gray semi-transparent hard brittle solid. Lab book reference number DK6-59C.

EXAMPLE THIRTY

To a 30 ml scintillation vial 2.75 g of Epon 828 was added to 0.25 g of the dispersion described in Example Twenty Seven (DK6-51A). The mixture was mixed by use of a spatula while sonicating at room temperature in a Branson sonicator at 55 KHz, resulting in a concentration of 0.014 wt %. When the mixture was homogeneous, 0.61 g Epicure 3234 was added, mixed while sonicated, poured into a dog-bone Teflon mold and the sample cured for one hour at 85° C., resulting in a gray semi-transparent hard brittle solid. Lab book reference number DK6-59D.

EXAMPLE THIRTY ONE

To a 30 ml scintillation vial 2.90 g of Epon 828 was added to 0.10 g of the dispersion described in Example Twenty Seven (DK6-51A). The mixture was mixed by use of a spatula while sonicating at room temperature in a Branson sonicator at 55 KHz, resulting in a concentration of 0.0057 wt %. When the mixture was homogeneous, 0.52 g Epicure 3234 was added, mixed while sonicated, poured into a dog-bone Teflon mold and the sample cured for one hour at 85° C., resulting in a gray semi-transparent hard brittle solid. Lab book reference number DK6-59E.

EXAMPLE THIRTY TWO

To a 30 ml scintillation vial 2.90 g of Epon 828 was added to 0.10 g of the dispersion described in Example Twenty Seven (DK6-51A). The mixture was mixed by use of a spatula while sonicating at room temperature in a Branson sonicator at 55 KHz, resulting in a concentration of 0.055 wt %. When the mixture was homogeneous, 0.50 g Epicure 3234 was added, mixed while sonicated, poured into a dog-bone Teflon mold and the sample cured for one hour at 85° C., resulting in a gray semi-transparent hard brittle solid. Lab book reference number DK6-59F. The samples made in Examples Twenty Eight through Thirty Two had cured and uncured conductivities that ranged from 5E-6 for the lowest concentration to 5E-4 for the highest concentrations. Conductivities of uncured samples with Epicure 3234 added were slightly higher, probably due to an added ionic conductivity. Cured samples tended to have slightly lower electrical conductivity than uncured samples. Dog-bone samples were tested by various compressive and tensile property measurements, by used of Instron tensile testing apparatus. The properties of at all concentrations were found to be essentially unchanged from the properties of control samples which contained no SWNTs and were cured by the same regime.

What is claimed is:

1. A process, comprising:
   providing a nanocarrier dispersion comprising a dilute concentration of individual nanoparticles dispersed or dissolved in a nanocarrier solvent, the nanocarrier solvent characterized as being soluble in a viscous medium, the nanocarrier dispersion having a viscosity substantially lower than the viscosity of the viscous medium;
   contacting the nanocarrier dispersion within the viscous medium, at least a portion of the nanocarrier solvent diffusing out of the nanocarrier dispersion and into the viscous medium; and
   continuously removing the nanocarrier solvent from the viscous medium to give rise to a plurality of nanoparticles dispersed or dissolved in the viscous medium.

2. The process of claim 1, wherein said process does not require a dispersing aid.

3. The process of claim 1, wherein the nanocarrier dispersion comprises one or more additives.

4. The process of claim 1, wherein the nanocarrier dispersion is free, or substantially free, of dispersing aid.

5. The process of claim 1, wherein the step of contacting comprises contacting a plurality of droplets, or a stream of the nanocarrier dispersion within the viscous medium.

6. The process of claim 1, wherein the nanocarrier solvent is continuously removed from the viscous medium by extracting the nanocarrier solvent with an aqueous phase.

7. A method of dispersing particles in a viscous fluid, comprising:
   providing an particle solution comprising solvent, particles, and polymer, the particle solution being characterized as comprising well dispersed individual particles and said solvent characterized as being more soluble in water than in the viscous fluid;
   continuously contacting droplets of the particle solution with the viscous fluid in a droplet contact zone to form a mixture comprising the particles, the solvent, and the viscous fluid;
   transporting the droplets of the particle solution away from the droplet contact zone, the transported droplets being richer in solvent exterior to the droplet zone, the particles and polymer entering the viscous fluid; and
   contacting the viscous fluid with an aqueous phase at an interface zone located exterior to the droplet contact zone while simultaneously extracting at least a portion of the solvent out of the viscous fluid.

8. The method of claim 7, wherein said viscous medium comprises curable polymer resin, non-curable polymer resin, monomer, or any combination thereof.

9. The method of claim 7, wherein at least a portion of said mixture is sonicated during all or part of the method at a frequency in the range of from about 1 Hz to about 10,000 KHz.

10. The method of claim 7, wherein said first particle dispersion is added to within said viscous medium drop-wise, stream-wise, pulsed, by use of gravity, syringe pumps, fluid pumps, peristaltic pumps, vacuum pumps, or any combination thereof.

11. The method of claim 7, wherein said particles comprise carbon nanotubes comprising SWNTs, DWNTs, MWNTs, carbon nanofibers, graphite fibers, or any combination thereof.

12. The method of claim 7, wherein said solvent is characterized as being miscible with said viscous medium.

13. The method of claim 7, wherein said solvent comprises a water miscible highly polar solvent.

14. The method of claim 7, wherein said solvent comprises a water immiscible solvent.

15. The method of claim 7, wherein the particles comprise individual particles smaller than about 125 microns in diameter, aggregates of individual particles smaller than about 125 microns in diameter, or any combination thereof.

16. The method of claim 7, wherein the first particle dispersion is substantially free of particle aggregates.

17. The method of claim 7, wherein the particles comprise insoluble materials comprising one or more of the following: aluminum, gallium, indium, tin, thallium, lead, bismuth, metalloids, halogens, noble gases, rare earth elements, pigments, catalysts, silica, hollow glass spheres, zinc oxide particles, aerogels, thermoplastic powders, thermoset powders, metals, non-metals, an alkali metal comprising lithium, sodium, potassium, rubidium, cesium, or francium, an alkaline earth metal comprising beryllium, magnesium, calcium, strontium, barium, or radium, a transition metal comprising scandium, titanium, vanadium, chromium, manganese, iron, cobalt, nickel, copper, zinc, yttrium, zirconium, niobium, molybdenum, technetium, ruthenium, rhodium, rhodium, palladium, silver, cadmium, hafnium, tantalum, tungsten, rhenium, osmium, iridium, platinum, gold, mercury, or rutherfordium, and liquid crystalline compounds.

18. The method of claim 7, wherein the particles comprise ceramic precursor powder, superconducting ceramic precursor powder, superhard ceramic precursor powder, or any combination thereof.

19. The method of claim 7, wherein the particles comprise powdered pigments.

20. The method of claim 7, wherein the particles comprise in natural or modified natural fibers, synthetic in fibers, or any combination thereof.

21. A method of dispersing particles in a viscous medium, comprising:
providing an particle solution comprising a plurality of particles and a solvent, the particle solution being characterized as comprising essentially well dispersed individual particles, and said solvent characterized as being more soluble in water than in the viscous medium;
contacting the particle solution with the viscous medium in a dispersion zone to form a one-phase mixture comprising the particles, the solvent, and the fluid medium; and
contacting said one-phase mixture with an aqueous phase at an interface zone located exterior to the dispersion zone while simultaneously extracting at least a portion of the solvent out of the one-phase mixture and into the aqueous phase.

22. A method of dispersing particles in an fluid medium, comprising:
providing an particle solution comprising a plurality of particles and a solvent, the particle solution being characterized as comprising essentially well dispersed individual particles, and said solvent characterized as being more soluble in water than in the fluid medium;
contacting the particle solution with the fluid medium in a dispersion zone to form a one-phase mixture comprising the particles, the solvent, and the fluid medium, said contacting occurring while simultaneously sonicating both the particle solution and the fluid medium in the dispersion zone; and
contacting said one-phase mixture with an aqueous phase at an interface zone located exterior to the dispersion zone while simultaneously extracting at least a portion of the solvent out of the one-phase mixture and into the aqueous phase.

* * * * *